United States Patent
Choi et al.

(10) Patent No.: US 10,397,453 B2
(45) Date of Patent: Aug. 27, 2019

(54) ELECTRONIC DEVICE INCLUDING CAMERA

(71) Applicant: Samsung Electronics Co., Ltd., Gyeonggi-do (KR)

(72) Inventors: Bong-Suk Choi, Seoul (KR); Doo-Ryong Kim, Gyeonggi-do (KR); Oh-Hee Lee, Gyeonggi-do (KR); An-Jin Nam, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/666,186

(22) Filed: Aug. 1, 2017

(65) Prior Publication Data

US 2018/0054553 A1    Feb. 22, 2018

(30) Foreign Application Priority Data

Aug. 17, 2016    (KR) .................. 10-2016-0104525

(51) Int. Cl.
| | |
|---|---|
| *H04N 5/225* | (2006.01) |
| *H04N 13/243* | (2018.01) |
| *H04N 5/232* | (2006.01) |
| *H04N 5/247* | (2006.01) |
| *H04N 13/239* | (2018.01) |
| *H04M 1/04* | (2006.01) |

(52) U.S. Cl.
CPC ......... *H04N 5/2252* (2013.01); *H04N 5/2258* (2013.01); *H04N 5/23238* (2013.01); *H04N 5/247* (2013.01); *H04N 13/239* (2018.05); *H04N 13/243* (2018.05); *H04M 1/04* (2013.01)

(58) Field of Classification Search
CPC .................................................. H04N 5/2252
USPC ........................................................ 348/373
See application file for complete search history.

(56) References Cited

U.S. PATENT DOCUMENTS

| | | | |
|---|---|---|---|
| 2011/0249100 A1* | 10/2011 | Jayaram ............... | H04N 5/2253 348/48 |
| 2014/0160274 A1* | 6/2014 | Ishida ..................... | G01S 19/14 348/113 |
| 2016/0142595 A1 | 5/2016 | Kim et al. | |
| 2016/0352982 A1* | 12/2016 | Weaver .............. | H04N 5/23238 |

* cited by examiner

*Primary Examiner* — Joel W Fosselman
(74) *Attorney, Agent, or Firm* — The Farrell Law Firm, P.C.

(57) ABSTRACT

An electronic device is provided which includes an upper cover unit including at least one first camera that faces a first direction, a plurality of second camera pairs disposed to face a second direction, second cameras included in each of the second camera pairs being arranged to face directions that intersect each other, a housing including a plurality of first openings, to which the plurality of second camera pairs are at least partially coupled to be exposed to an outside, and a first support member disposed in an accommodation space inside the housing, and providing a seating space for a printed circuit unit electrically connected with a connector of the upper cover unit.

19 Claims, 33 Drawing Sheets

ELECTRONIC DEVICE INCLUDING CAMERA

PRIORITY

This application claims priority under 35 U.S.C. § 119(a) to Korean Patent Application Serial No. 10-2016-0104525, which was filed in the Korean Intellectual Property Office on Aug. 17, 2016, the entire content of which is incorporated herein by reference.

BACKGROUND

1. Field of the Disclosure

The present disclosure generally relates to an electronic device, and more particularly, to an electronic device including a plurality of cameras capable of omnidirectional photographing.

2. Description of the Related Art

An electronic device may perform a specific function according to a provided program, such as an electronic scheduler, a portable multimedia reproducer, a mobile communication terminal, a tablet personal computer (PC), an image/sound device, a desktop/laptop PC, a vehicular navigation system, or a home appliance. An electronic device may output information stored therein as sound or an image.

As the development of cameras has progressed rapidly, and as the distribution of cameras has expanded, taking panorama images or three-dimensional stereoscopic images through cameras having an angle of view of 180 degrees or more is increasing. In addition, a camera capable of acquiring panorama images or three-dimensional images may be utilized for providing realistic guidance for a facility (e.g., a museum), or in a public facility as a surveillance camera that does not have a blind spot, and the like.

When existing electronic devices include a plurality of cameras that are mounted on the housing thereof, the number of assembly steps increases and the space between the cameras is difficult to reduce since each of the cameras is individually assembled. In addition, since each of the cameras is individually assembled, there is a problem in that the possibility of causing an error may increase due to assembly and manufacturing tolerances.

Since the existing electronic devices include many electronic devices therein, there is the risk of increased system load due to heat generation, and when the existing electronic devices are installed outdoors, there is a risk of infiltration of external fluid.

SUMMARY

According to an aspect of the present disclosure, an electronic device including a camera is provided in which a space in which the camera is mounted is efficiently disposed to minimize the number of openings and screws of the electronic device, and to solve a problem caused by constraints in assembly and fastening direction.

According to another aspect of the present disclosure, an electronic device is provided in which a waterproof structure and a heat radiation structure are efficiently implemented so as to provide waterproof and heat radiation effects.

According to another aspect of the present disclosure, an electronic device is provided including a camera which has a simple and clean design on the exterior thereof, by disposing a fastening member for fastening the electronic device.

In accordance with an aspect of the present disclosure, an electronic device is provided which includes an upper cover unit including at least one first camera that faces a first direction, a plurality of second camera pairs disposed to face a second direction, and second cameras included in each of the second camera pairs being arranged to face directions that intersect each other, a housing including a plurality of first openings, to which the plurality of second camera pairs are at least partially coupled to be exposed to an outside, and a first support member disposed in an accommodation space inside the housing and providing a seating space for a printed circuit unit electrically connected with a connector of the upper cover unit.

In accordance with another aspect of the present disclosure, an electronic device is provided which includes an upper cover unit including at least one first camera that faces a first direction, a housing including a plurality of brackets in each of which a pair of second cameras that face second directions, and a plurality of first openings such that the plurality of brackets are at least partially exposed to an outside, a first support member disposed in an accommodation space inside the housing so as to provide a seating space for a printed circuit unit, a lower cover unit disposed in a lower portion of the housing and including at least one third opening exposed to the outside for connection to an external electronic device, and a second support member disposed between the lower cover unit and the first support member and including at least one fourth opening disposed at a position corresponding to the third opening in the lower cover unit.

In accordance with another aspect of the present disclosure, an electronic device is provided which includes a bracket that includes a front portion including a first surface that is in contact with a first opening in a housing, a rear portion including a second surface disposed to be in contact with at least a portion of a pair of cameras, and a pair of second openings formed to penetrate the front portion and the rear portion, wherein the second openings are disposed to form a predetermined angle such that the pair of cameras may face different directions, and lenses of the pair of camera may be exposed to an outside through the second openings.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
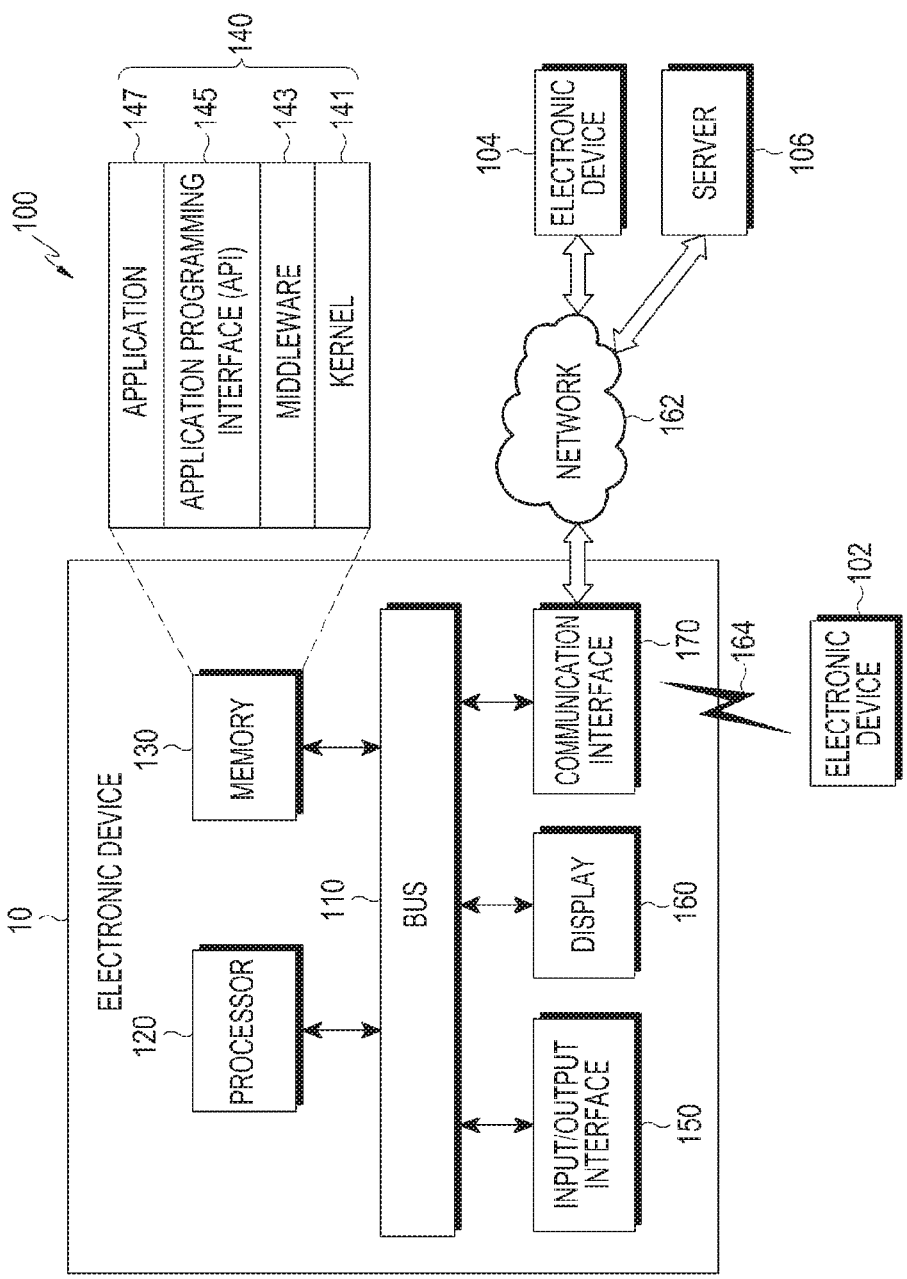
FIG. 1 is a block diagram illustrating an electronic device within a network environment, according to an embodiment of the present disclosure.

Hereinafter, certain embodiments of the present disclosure will be described with reference to the accompanying drawings. The embodiments and terms used therein do not limit the technology disclosed herein to specific forms, and should be understood to include various modifications, equivalents, and/or alternatives to the corresponding embodiments. In the description of the drawings, similar reference numerals may be used to designate similar elements. A singular expression may include a plural expression unless they are different in a context. As used herein, singular forms may include plural forms as well unless the context clearly indicates otherwise.

The expressions "a first", "a second", "the first", or "the second" as used in certain embodiments of the present disclosure may modify various components regardless of the order and/or the importance but do not limit the corresponding components. When an element (e.g., first element) is referred to as being "(functionally or communicatively) connected," or "directly coupled" to another element (second element), the element may be connected directly to the other element or connected to the other element through another element (e.g., third element).

The expression "configured to" as used in certain embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". The phrase "processor adapted (or configured) to perform A, B, and C" may mean a dedicated processor (e.g., embedded processor) only for performing the corresponding operations or a general-purpose processor (e.g., central processing unit (CPU) or application processor (AP)) that may perform the corresponding operations by executing one or more software programs stored in a memory device.

An electronic device according to an embodiment of the present disclosure may include at least one of, for example, a smart phone, a tablet PC, a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit). The electronic device may include at least one of, for example, a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic device for a ship (e.g., a navigation device for a ship, and a gyro-compass), avionics, security devices, an automotive head unit, a robot for home or industry, an automatic teller machine (ATM), a point of sales (POS) terminal, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

An electronic device may include at least one of a part of furniture or a building/structure, an electronic board, an electronic signature receiving device, a projector, and various types of measuring instruments (e.g., a water meter, an electric meter, a gas meter, a radio wave meter, and the like). The electronic device may be flexible, or may be a combination of one or more of the aforementioned various devices. The electronic device is not limited to the above described devices. In the present disclosure, the term "user" may indicate a person using an electronic device or a device (e.g., an artificial intelligence electronic device) using an electronic device.

FIG. 1 is a block diagram illustrating an electronic device within a network environment, according to an embodiment of the present disclosure.

An electronic device 10 within the network environment 100, will be described with reference to FIG. 1. The electronic device 10 includes a bus 110, a processor 120, a memory 130, an input/output interface 150, a display 160, and a communication interface 170. At least one of the above-mentioned components may be omitted from the electronic device 10, or the electronic device 10 may additionally include other components. The bus 110 may include a circuit that interconnects the above-mentioned components 110 to 170 and supports communication (e.g., a control message or data) between the components 110 to 170. The processor 120 may include one or more of a central processing unit (CPU), an application processor (AP), and a communication processor (CP). The processor 120 may execute, for example, an arithmetic operation or data processing that is related to control and/or communication of one or more other components of the electronic device 10.

The memory 130 may include a volatile memory and/or a non-volatile memory. The memory 130 may store, for example, commands or data that are related to one or more other components of the electronic device 10. According to an embodiment of the present disclosure, the memory 130 may store software and/or a program 140. The program 140 includes, for example, a kernel 141, middleware 143, an application programming interface (API) 145, and/or applications 147. At least one of the kernel 141, the middleware 143, and the API 145 may be referred to as an operating system (OS). The kernel 141 may control or manage, for example, system resources (e.g., the bus 110, the processor 120, or the memory 130) that are used for executing operations or functions implemented in the other programs (e.g., the middleware 143, the API 145, or the applications 147). In addition, the kernel 141 may provide an interface that allows the middleware 143, the API 145, or the applications 147 to access individual components of the electronic device 10 so as to control or manage the system resources.

The middleware 143 may play an intermediary role such that the API 145 or the applications 147 may communicate with the kernel 141 to exchange data. In addition, the middleware 143 may process one or more task requests which are received from the applications 147, according to priority. The middleware 143 may assign priority for use of system resources of the electronic device 10 (e.g., the bus 110, the processor 120, or the memory 130) to at least one of the applications 147, and may process the one or more task requests. The API 145 is, for example, an interface that allows the applications 147 to control functions provided from the kernel 141 or the middleware 143, and may include, for example, one or more interfaces or functions (e.g., commands) for file control, window control, image processing, or character control. The input/output interface 150 may transmit commands or data, which are entered from, for example, a user or any other external device, to the other component(s) of the electronic device 10, or may output commands or data, which are received from the other component(s) of the electronic device 10, to the user or the other external device.

The display device 160 may include, for example, a liquid crystal display (LCD), a light emitting diode (LED) display, an organic light emitting diode (OLED) display, a microelectromechanical system (MEMS), or an electronic paper display. The display 160 may display various content (e.g., text, image, video, icon, or symbol) to, for example, the user. The display 160 may include a touch screen, and may receive a touch input, a gesture input, a proximity input, or a hovering input that is made using, for example, an electronic pen or a part of the user's body. The communication interface 170 may set, for example, communication between the electronic device 10 and a first external electronic device 102, a second external device 104, or a server 106). The communication interface 170 may be connected with a network 162 through wired or wireless communication so as to communicate with the second external electronic device 104 or the server 106.

The wireless communication may include cellular communication that uses at least one of, for example, long-term evolution (LTE), LTE Advance (LTE-A), code division multiple access (CDMA), wideband CDMA (WCDMA), universal mobile telecommunication System (UMTS), wireless broadband (WiBro), and global system for mobile communication (GSM). The wireless communication may include at least one of, for example, wireless fidelity (WiFi), Bluetooth™, Bluetooth™ low energy (BLE), ZigBee™, near field communication (NFC), magnetic secure transmission, radio frequency (RF), and body area network (BAN). The wireless communication may include GNSS. The GNSS may include, for example, at least one of a global positioning system (GPS), a global navigation satellite system (Glonass), a Beidou navigation satellite system (Beidou), and Galileo, and the European global satellite-based navigation system, according to, for example, a use area or bandwidth. Herein, the term "GPS" may be interchangeably used with the term "GNSS" below. The wired communication may use at least one of, for example, universal serial bus (USB), high definition multimedia interface (HDMI), recommended standard 232 (RS-232), and plain old telephone service (POTS). The network 162 may include a telecommunication network (e.g., at least one of a computer network (e.g., LAN or WAN), the Internet, and a telephone network).

Each of the first and second external electronic devices 102 and 104 may be of a type that is the same as or different from that of the electronic device 10. According to an embodiment of the present disclosure, all or some of the operations to be executed by the electronic device 10 may be executed in another electronic device or a plurality of other electronic devices (e.g., the electronic devices 102 and 104 or the server 106). In the case where the electronic device 10 performs a certain function or service automatically or upon request, the electronic device 10 may request some functions or services that are associated therewith from the electronic devices 102 and 104 or the server 106, instead of, or in addition to, executing the functions or service by itself. The electronic devices 102 and 104 or the server 106 may execute the requested functions or additional functions, and may deliver the results to the electronic device 10. The electronic device 10 may provide the requested functions or services by processing the received results as they are or additionally. For this purpose, for example, a cloud computing technique, a distributed computing technique, or a client-server computing technique may be used.

Figure 2:
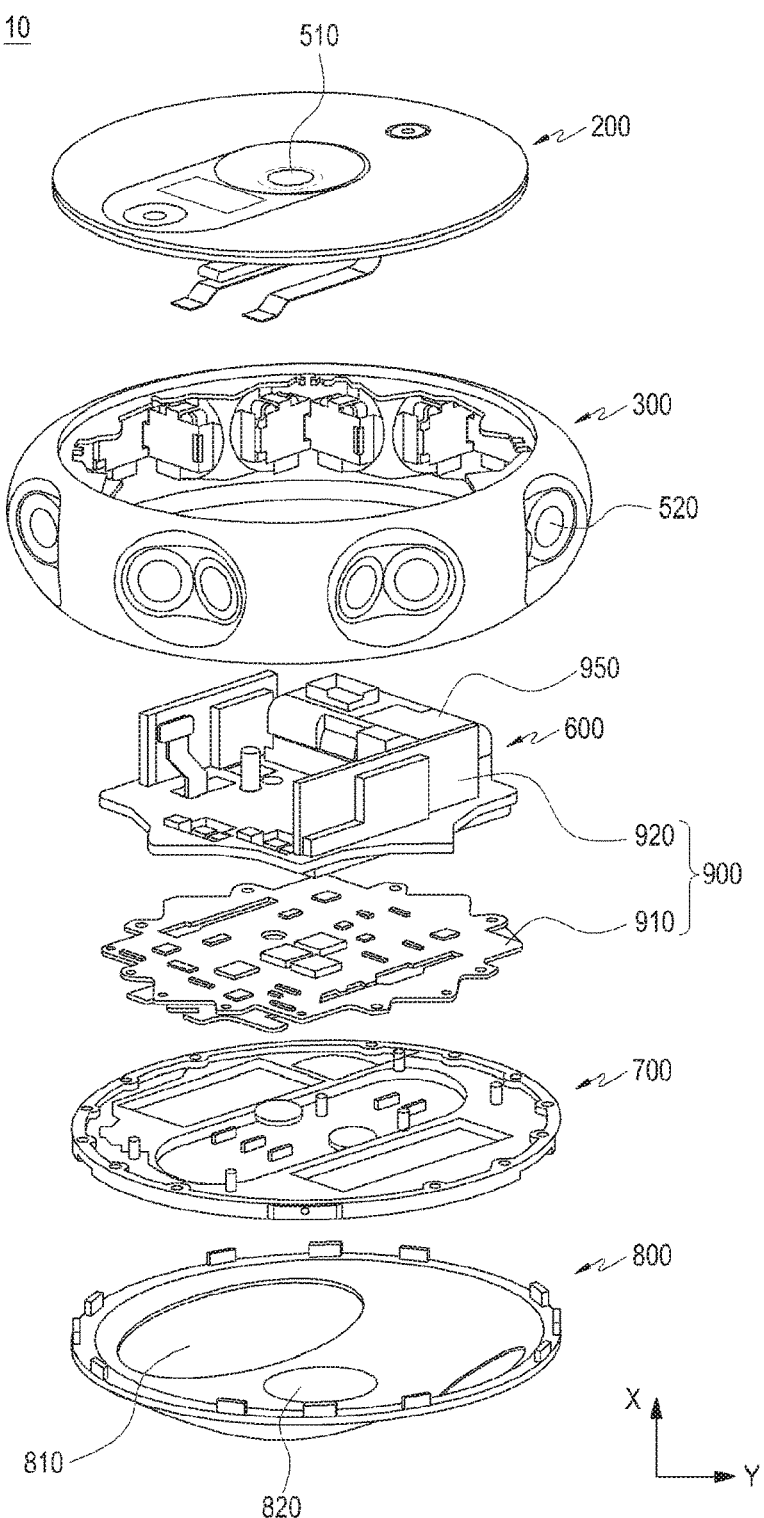
FIG. 2 is a perspective view illustrating an electronic device including a camera, according to an embodiment of the present disclosure.

FIG. 2 is a perspective view illustrating an electronic device including a camera, according to an embodiment of the present disclosure.

Figure 3A:
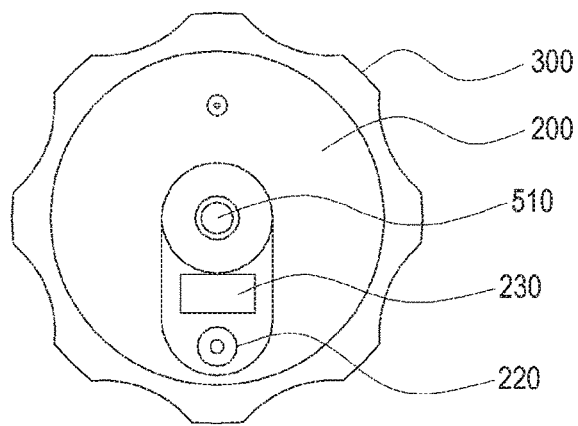
FIGS. 3A, 3B and 3C are a top plan view, a side view, and a rear view, respectively, which illustrate an electronic device including a camera, according to an embodiment of the present disclosure.
Figure 3B:
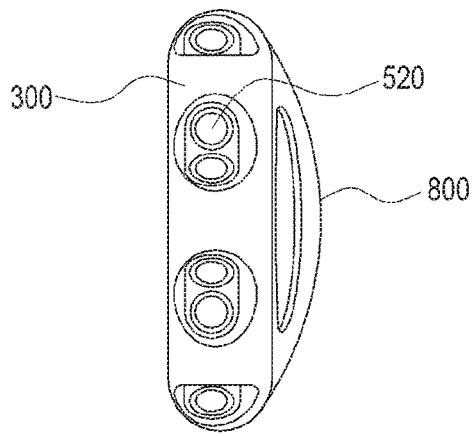
Figure 3C:
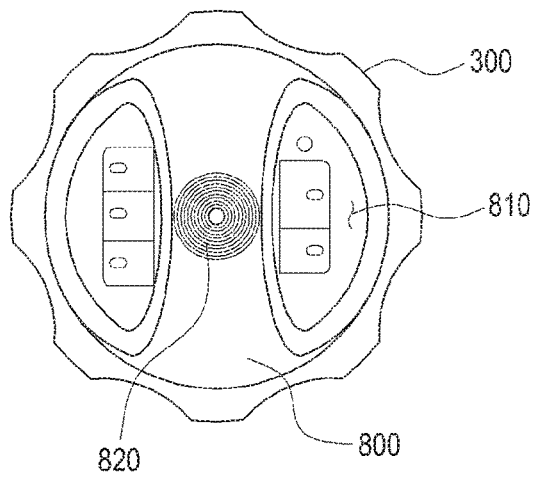

FIGS. 3A, 3B and 3C are a top plan view, a side view, and a rear view, respectively, which illustrate the electronic device including a camera, according to an embodiment of the present disclosure.

In FIG. 2, an "X-axis direction" in an orthogonal coordinate system of three axes may refer to the thickness direction of the electronic device 10, and a "Y-axis direction" may refer to the longitudinal direction of the electronic device 10. In an embodiment of the present disclosure, the "X-axis direction" may refer to a first direction (+X) and a third direction (−X), and the "Y-axis direction" may refer to a second direction (+Y, −Y), and may refer to all directions oriented perpendicular to the first direction.

As illustrated in FIGS. 2 and 3, the electronic device 10 includes an upper cover unit 200, a housing 300, a first support member 600, a second support member 700, and/or a lower cover unit 800.

According to an embodiment of the present disclosure, the upper cover unit 200 may be disposed on the upper side of the housing 300, and includes at least one first camera 510 facing the first direction (+X), a data input unit 220, and/or a data output unit 230. The first camera 510 is disposed in the center of the upper cover unit 200 so as to capture an image and/or a video image in an upward direction, an input device, such as a keypad, may be employed for the data input unit 220, and a display unit, such as a display device, may be employed for the data output unit 230.

According to an embodiment of the present disclosure, the housing 300 is configured to provide a space for accommodating various electronic components, and includes a second camera 520 disposed to face a second direction (+Y) that is different from the first direction (+X). A plurality of second cameras 520 may be disposed to be exposed to the outer surface of the housing 300 such that omnidirectional photographing is enabled in the lateral direction.

According to an embodiment of the present disclosure, a first support member 600 may be mounted within the housing 300. The first support member 600 may be made of a metallic material and/or a plastic material, and may be disposed within an accommodation space 320 that is formed by the housing 300 and the upper cover unit 200. The first support member 600 is disposed within the housing 300 and provides a space for mounting various electronic components, and a printed circuit unit 900 including a printed circuit board and/or a battery 950 may be accommodated in the space.

The printed circuit unit 900 may be mounted on the first support member 600, and includes different printed circuit boards 910 and 920 which are disposed on the upper side and/or the lower side of the printed circuit unit 900. The first support member 600 may prevent the different printed circuit boards 910 and 920 from coming into contact with each other, and may prevent electromagnetic interference between integrated circuit chips by providing an electromagnetic shielding function.

According to an embodiment of the present disclosure, a second support member 700 may be disposed under the first support member 600. The second support member 700 may be made of a metallic material and/or a plastic material, and may be disposed within a space that is formed by the housing 300 and the lower cover unit 800. The second support member 700 may be disposed under and bound to the housing 300 so as to provide a space for mounting various electronic components.

According to an embodiment of the present disclosure, the first support member 600 and/or the second support member 700 may reinforce the rigidity of the electronic device 10. The housing 300 may be formed with a plurality of openings or recesses depending on the arrangement of the electronic components inside the electronic device 10, which may reduce the rigidity of the housing 300 or the electronic device 10. The first support member 600 may be mounted within and bound to the housing 300 so as to improve the rigidity of the housing 300 or the electronic device 10.

According to an embodiment of the present disclosure, various structures may be formed on the surfaces of the housing 300 and the first and second support members 600 and 700 according to the arrangement of the electronic components disposed inside the electronic device 10 or the binding structures between the housing 300 and the first and second support members 600 and 700. For example, a space may be formed in each of the housing 300 and the first and second support members 600 and 700 to accommodate integrated circuit chips mounted on the printed circuit unit 900. The space for accommodating integrated circuit chips may be in the form of a recess or may be a rib and the like that surrounds the integrated circuit chips. Corresponding fastening bosses and fastening holes may be formed in the housing 300 and the first and second support members 600 and 700. For example, when fastening members, such as screws, are fastened to the fastening bosses or the fastening holes, the housing 300 and the first and second support members 600 and 700 may be bound to each other in which the housing 300 and the first and second support members 600 and 700 face each other, or in which the first and second support members 600 and 700 are accommodated in the housing 300.

According to an embodiment of the present disclosure, the lower cover unit 800 may be disposed below the housing 300, and includes at least one opening 810 that faces the third direction (−X). The lower cover unit 800 includes a coupling portion 820 in the center thereof, which is connected to an external device. The opening 810 in the lower cover unit 800 is formed at a position corresponding to the opening 710 in the second supporting member 700, and the fastening portion 820 may be connected to an external support device capable of supporting the device 10, and the like.

Figure 4:
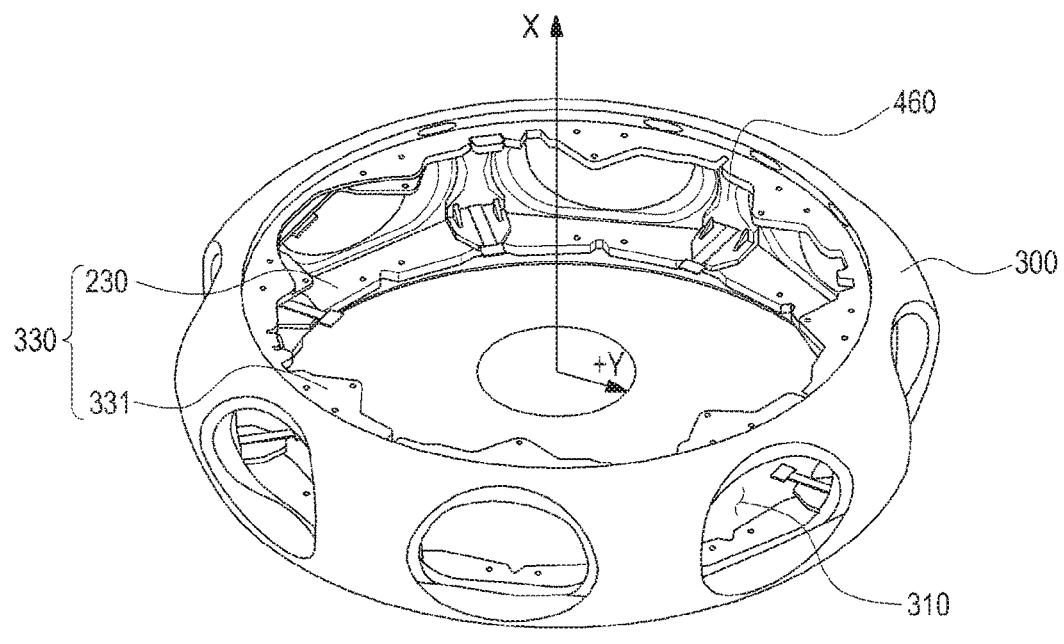
FIG. 4 is a projected perspective view illustrating a housing, which is mounted with a phone holder, according to an embodiment of the present disclosure.

FIG. 4 is a projected perspective view illustrating the housing 300, which is mounted with a phone holder 460, according to an embodiment of the present disclosure.

As illustrated in FIG. 4, the housing 300 includes a plurality of first openings 310 arranged in a side surface thereof so as to form a predetermined pattern, and at least one phone holder 460 may be arranged between the plurality of first openings 310 so as to form a predetermined pattern. The housing 300 may have a ring-shaped structure when viewed from the upper side, eight first openings 310 may be disposed at regular intervals, and a phone holder 460 may be installed between every two adjacent first openings 310.

According to an embodiment of the present disclosure, the size of the outer hole and the size of the inner hole in each of the first openings 310 in the housing 300 may be different from each other. For example, in each first opening 310, the outer hole is formed to be relatively smaller than the size of the inner hole, so that when a second camera 520 is fitted from the inner side toward the outer side (the second direction (+Y)), it is possible to prevent the second camera 520 from breaking away from the housing 300 to the outside and to improve the sealing reliability of the electronic device 10.

According to an embodiment of the present disclosure, the upper side and/or the lower side of the housing 300 are open, and the upper cover unit 200 illustrated in FIG. 2 may be bound to the lower cover unit 800 and/or the second support member 700 so as to close the opening. The side portion of the housing 300 may be arranged in an overall convex surface shape in which the center line protrudes in the second direction (+Y).

According to an embodiment of the present disclosure, steps 330 may be formed on the upper side and/or the lower side of the housing 300 so that the upper cover unit 200 and/or the second support member 700 may be seated on and assembled to the steps 330, and fastening bosses or fastening holes corresponding to the upper cover part 200 and/or the second support member 700 may be formed in the steps 330. For example, when the fastening members, such as screws, are fastened to the fastening bosses or the fastening holes, the housing 300 and the upper cover unit 200 and/or the second supporting member 700 may be coupled to each other.

Figure 5:
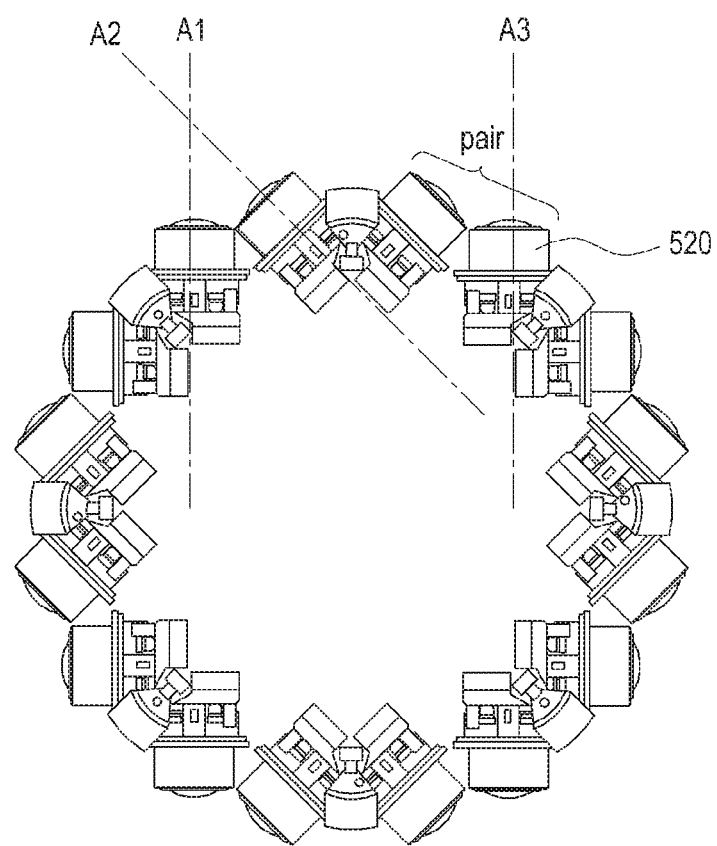
FIG. 5 is a top plan view illustrating an array pattern of a plurality of second cameras disposed in a housing, according to an embodiment of the present disclosure.

FIG. 5 is a top plan view illustrating an array pattern of a plurality of second cameras 520 disposed in the housing 300, according to an embodiment of the present disclosure.

Figure 6:
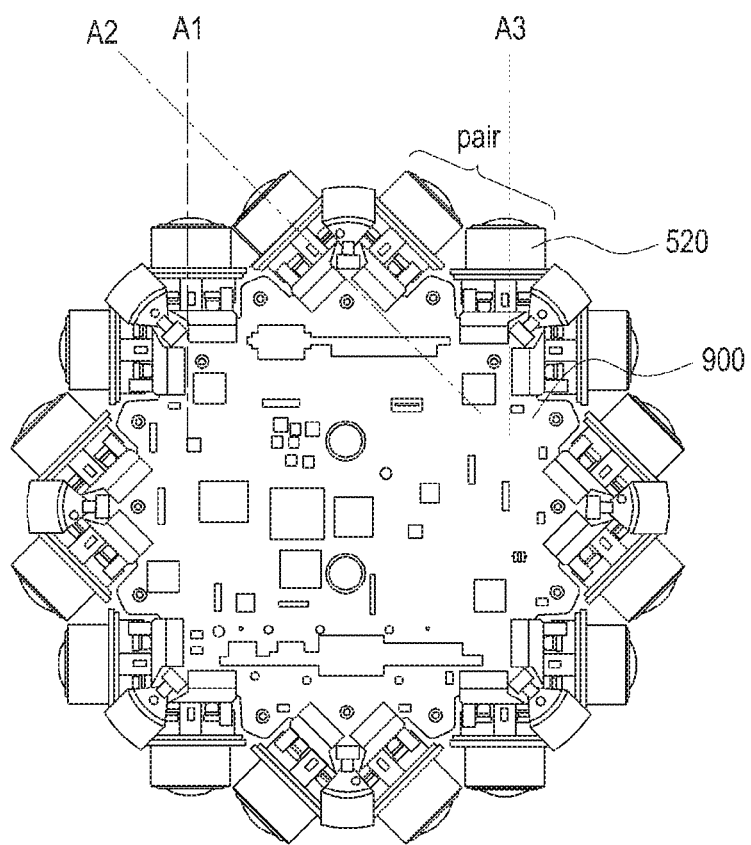
FIG. 6 is a top plan view illustrating a printed circuit unit mounted inside the plurality of second cameras of FIG. 5, according to an embodiment of the present disclosure.

FIG. 6 is a top plan view illustrating a printed circuit unit 900 mounted inside the plurality of second cameras 520 of FIG. 5, according to an embodiment of the present disclosure.

Referring to FIGS. 5 and 6, two second cameras 520 form one pair, which is assembled to each of the first openings 310 of the housing 300 illustrated in FIG. 2. The two second cameras 520, which constitute one pair, may have a first imaginary axis A1 and a second imaginary axis A2, respectively, with reference to a lens center, and the first imaginary axis A1 and the second imaginary axis A2 are disposed to face different directions. Second cameras 520, which are included in different pairs, may have a first imaginary axis A1 and a third imaginary axis A3, respectively, with reference to a lens center, and the first imaginary axis A1 and the third imaginary axis A3 may be disposed parallel to each other. The arrangement of a second camera having the first imaginary axis A1 and a second camera having the third imaginary axis A3 may be arranged such that the two lenses may mutually maintain focus in the state where the two lenses are parallel to each other like a human's eyes, and may acquire a three-dimensional image.

According to an embodiment of the present disclosure, the second cameras 520 may be arranged while maintaining a pattern of a predetermined interval in all orientations (0-360 degrees) in the second direction (+Y) so as to omnidirectionally capture images and/or video images in the lateral direction. The second cameras 520 having the imaginary axes parallel to each other may be arranged in a total of 8 pairs with a predetermined interval in the omnidirectional line. However, the number and arrangement of the second cameras 520 are not limited, and the number and arrangement of the second cameras may be varied in order to effectively acquire three-dimensional images.

Figure 10:
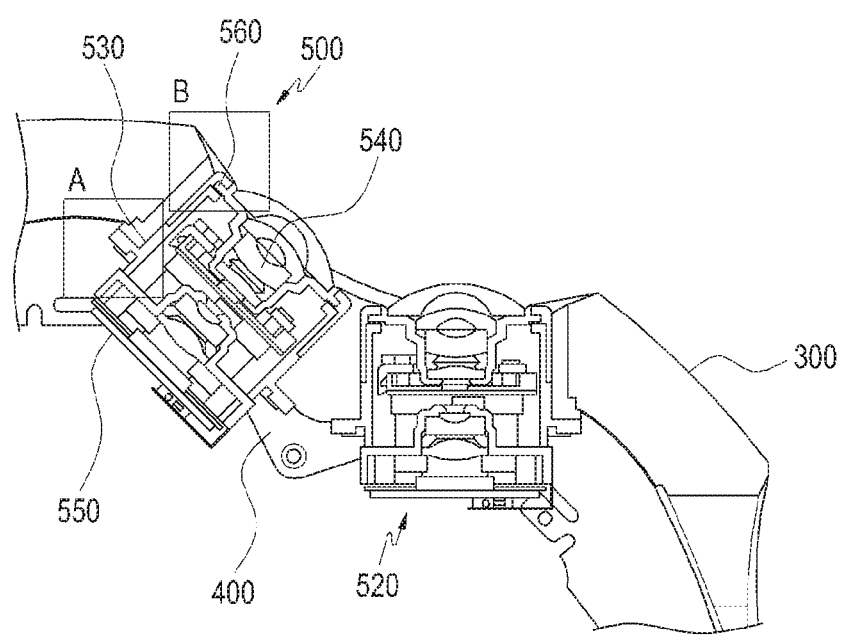
FIG. 10 is a cross-sectional view illustrating a waterproof structure of a housing, a bracket, and second cameras, according to an embodiment of the present disclosure.

Referring to FIG. 10, each of the second cameras 520 includes a camera housing 530, a lens assembly 540, an image sensor, a printed circuit unit, a base 550, and the like. The camera housing 530 may serve as a cover for protecting the lens assembly 540 mounted therein. The lens assembly 540 is disposed inside the camera housing 530 and the base 550, and may include at least one wide-angle lens. The wide-angle lens may include various lenses, such as a fisheye lens, an ultra-wide-angle lens, and the like. The fisheye lens used in the second cameras 520 is an ultra-wide-angle lens having a view angle of more than 180 degrees, and allows an entire object occupying a field of view of 180 degrees to be photographed within one circle. The lens assembly 540 may further include an optical member, such as a concave lens or a convex lens, arranged on the light path so as to adjust the focal distance, in addition to the wide-angle lens.

According to an embodiment of the present disclosure, a protective member 560 may be disposed inside the camera housing 530 and outside the lens assembly 540 which is capable of at least partially protecting the lenses of the lens assembly 540, and of fixing the wide-angle lens.

According to an embodiment of the present disclosure, the image sensor is disposed inside the camera housing 530 and detects the information of a subject obtained from the lens assembly 540 and converts the information into an electrical image signal. A charge-coupled device (CCD) image sensor or a complementary metal oxide semiconductor (CMOS) image sensor may be used as the image sensor. However, without being limited thereto, other sensor elements, which perform similar functions, may be included.

According to an embodiment of the present disclosure, in addition to the image sensor, an operation recognition sensor for recognizing the user's operation and a voice recognition sensor for recognizing the user's voice may be provided within the second camera 520. In addition, each of the sensors may sense various kinds of information according to the user's instructions and may transmit the sensed information to a control circuit of the printed circuit unit.

According to an embodiment of the present disclosure, in the electronic device 10, the printed circuit unit may be arranged within the housing 300 and/or may be surrounded by the second cameras 520. The printed circuit unit may include a main printed circuit board 910, and various electronic elements may be arranged in the form of integrated circuits (ICs). The main printed circuit board 910 may include various elements, such as an image processing element for storing and processing an image captured by the lens assembly 540. Wired communication terminals for connecting external devices, which are connected to communication units of different printed circuit boards and are connected to external devices through wired connectors, may be disposed on one side of the main printed circuit board 910.

Figure 7A:
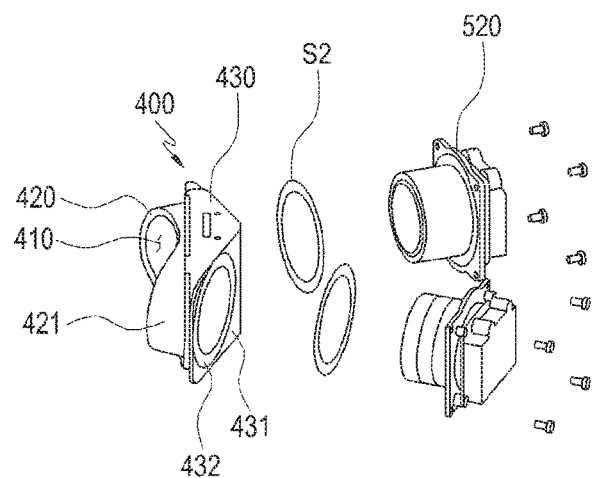
FIGS. 7A and 7B are exploded perspective views illustrating a coupling relationship between a bracket mounted in the housing and second cameras mounted on the bracket, according to an embodiment of the present disclosure.
Figure 7B:
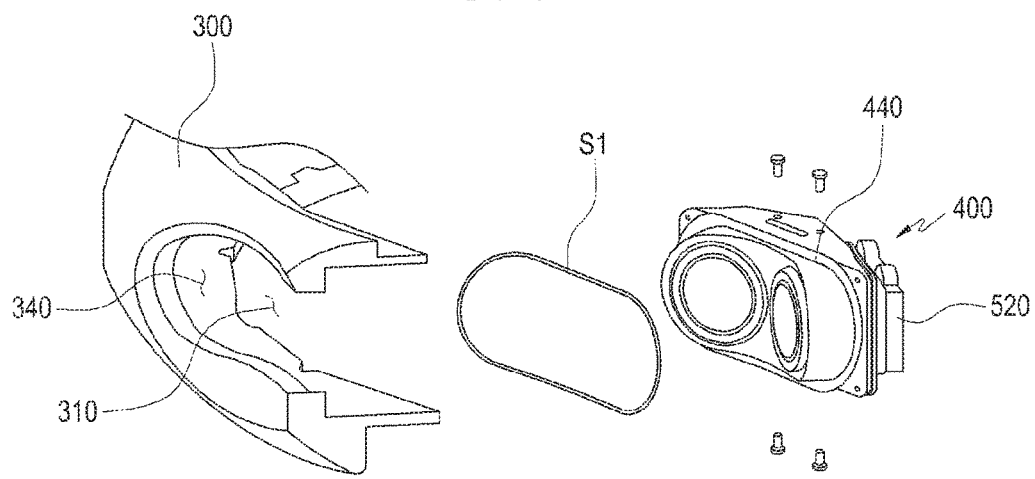

FIGS. 7A and 7B are exploded perspective views illustrating a coupling relationship between a bracket 400 mounted in the housing 300 and second cameras 520 mounted on the bracket 400, according to an embodiment of the present disclosure.

Figure 8A:
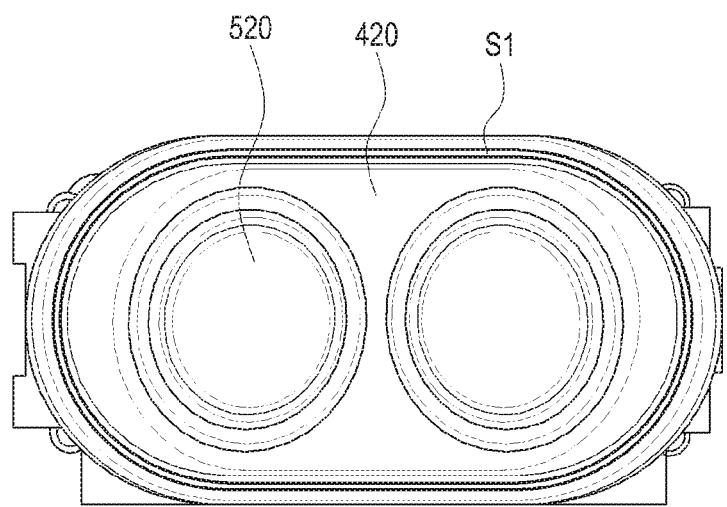
FIGS. 8A and 8B are a front view and a perspective view, respectively, illustrating a pair of second cameras mounted on a bracket, according to an embodiment of the present disclosure.
Figure 8B:
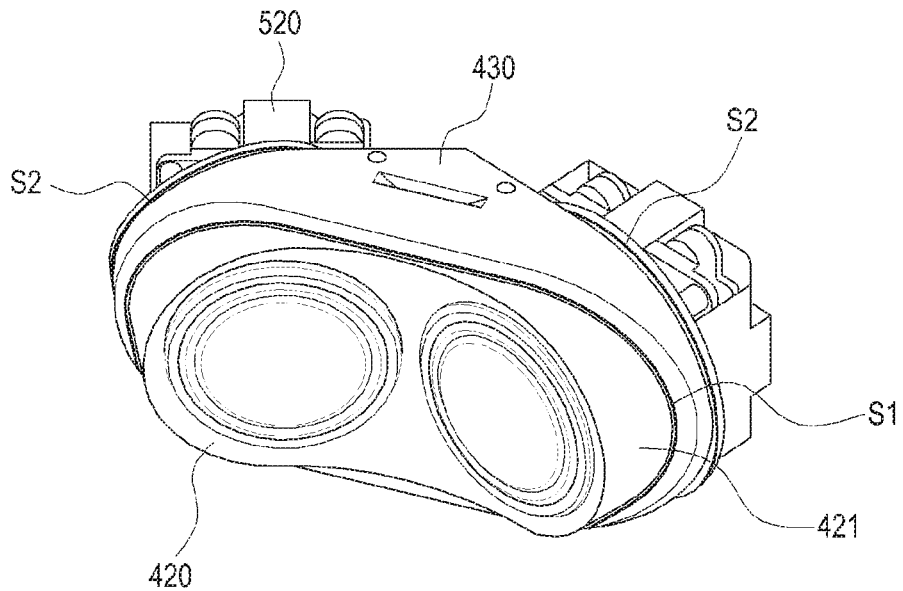

FIGS. 8A and 8B are a front view and a perspective view, respectively, illustrating a pair of second cameras 520 mounted on the bracket 400, according to an embodiment of the present disclosure.

Referring to FIGS. 7 and 8, the electronic device 10 includes a housing 300, a bracket 400 coupled to a first opening 310 in the housing 300, second cameras 520 mounted in a second opening 410 in the bracket 400, a first sealing member S1, and/or a second sealing member S2.

According to an embodiment of the present disclosure, as described above, the housing 300 includes a plurality of first openings 310, which are opened laterally to face the second direction (+Y), and the first openings 310 are arranged in a ring-shaped pattern. The bracket 400 may be individually assembled in each of the plurality of first openings 310 in the housing 300, and the second cameras 520 may be assembled in at least one second opening 410 in the bracket 400.

According to the order of assembly processes, the processes of coupling the second cameras 520 to the bracket 400 illustrated in FIG. 7A will be first described, and then the processes of coupling the bracket 400 to the housing 300 illustrated in FIG. 7B will be described later.

According to an embodiment of the present disclosure, the bracket 400 includes a front portion 420 including a first surface 421 disposed to be in contact with the housing 300 and a rear portion 430 including a second surface 431 disposed to be in contact with at least a portion of the second cameras 520. A pair of second openings 410 of the bracket 400 may be provided to penetrate the front and rear portions 420 and 430.

According to an embodiment of the present disclosure, the front portion 420 of the bracket 400 is disposed to be exposed to the outside through the first opening 310 in the housing 300, and the rear portion 430 of the bracket 400 may have an outer diameter relatively larger than the outer diameter of the front portion 420, and may be disposed to be directed toward the inside of the housing 300.

According to an embodiment of the present disclosure, one pair of second openings 410 may be arranged in the bracket 400, and the centers of the respective second openings 410 may face different directions. For example, when viewed from the upper side, the bracket 400 may have a ">" shape having a predetermined slope, and to correspond thereto, the pair of second openings 410 may also have a predetermined slope. Thus, the extensions of the imaginary axis of the lens center of one of the second openings 410 and the imaginary axis of the lens center of the other second opening 410 may form an intersection point with each other.

According to an embodiment of the present disclosure, on the rear portion 430 of the bracket 400, second seating recesses 432 may be disposed around the second openings 410 such that the second cameras 520 may be at least partially seated in the second seating recesses 432, respectively. Fastening bosses or fastening holes, which correspond to each other, may be formed inside or around the second seating recesses 432 in the bracket 400 so as to be bound with the second cameras 520. The second seating recesses 432 may have a structure corresponding to the outer shape of the second cameras 520 such that the second cameras 520 may be partially inserted into and fixed to the second seating recesses 432. Each of the second seating recesses 432 may be formed in a ring shape. Fastening holes may be provided in the second cameras 520 so as to correspond to the fastening holes disposed in the bracket 400, and when fasteners, such as screws, are fastened into the fastening holes, the bracket 400 and the second cameras 520 may be bound in the state in which the second seating recesses 432 and the second cameras 520 are accommodated so as to face each other.

According to an embodiment of the present disclosure, ring-shaped second sealing members S2, which are capable of suppressing the infiltration of fluid, may be interposed between the second cameras 520 and the second seating recesses 432. The second sealing members S2 may be configured in a pair to correspond to the second cameras 520, respectively, and the second sealing members S2 may be arranged to form a predetermined angle with respect to each other.

According to an embodiment of the present disclosure, the front portion 420 of the bracket 400 may be seated in a first seating recess 340 in the housing 300. The outer diameter of the front portion 420 of the bracket 400 may be smaller than the outer diameter of the rear portion 430 thereof so that the front portion 420 of the bracket 400 may be fastened into the first seating recess 340 in a fitting manner. A step 440 having a predetermined height toward the rear portion 430 may be disposed between the front portion 420 and the rear portion 430 such that a space in which the first sealing member S1 may be seated may be provided by the step 440.

According to an embodiment of the present disclosure, fastening bosses or fastening holes, which correspond to each other, may be formed in the top or bottom surface of the first seating recess 340 in the housing 300 so as to be bound with the bracket 400. The first seating recess 340 may have a structure corresponding to the outer shape of the front portion 420 of the bracket 400 such that the front portion 420 of the bracket 400 may be inserted into and fixed into the second seating recess 432. The first seating recess 340 may be formed as a recess having a closed curve shape. As still another example, fastening holes may also be disposed in the upper or lower surface of the rear portion 430 of the bracket 400 so as to correspond to fastening holes formed in the first seating recess 340, and when fastening members, such as screws, are fastened to the fastening holes, the housing 300 and the bracket 400 may be bound to each other in the state in which one surface of the housing 300 and one surface of the bracket 400 are accommodated to face each other. The binding between the housing 300 and the bracket 400 may be performed after the front portion 420 of the bracket 400 is seated in the first seating recess 340 in the housing 300.

According to an embodiment of the present disclosure, a ring-shaped first sealing member S1, which is capable of suppressing the infiltration of fluid, may be interposed between the first seating recess 340 in the housing 300 and the bracket 400. The first sealing member S1 may provide a waterproof function so as to block the entry of the fluid and foreign matter into the first opening 310.

Referring to FIGS. 7A and 7B and FIGS. 8A and 8B, after the second cameras 520 are seated in the second openings 410 of the bracket 400 so as to face the second direction (+Y), fastening members, such as screws, may be fastened in the second direction (+Y) toward the fastening holes disposed on the bracket 400 and the second cameras 520. Thereafter, the bracket 400, on which the second cameras 520 are mounted, is seated in the first opening 310 in the housing 300 in the second direction (+Y), subsequently, fastening members, such as screws, may be fastened in the first direction (+X) and/or the third direction (−X) toward the fastening holes arranged on the bracket 400 and the housing 300.

Figure 9:
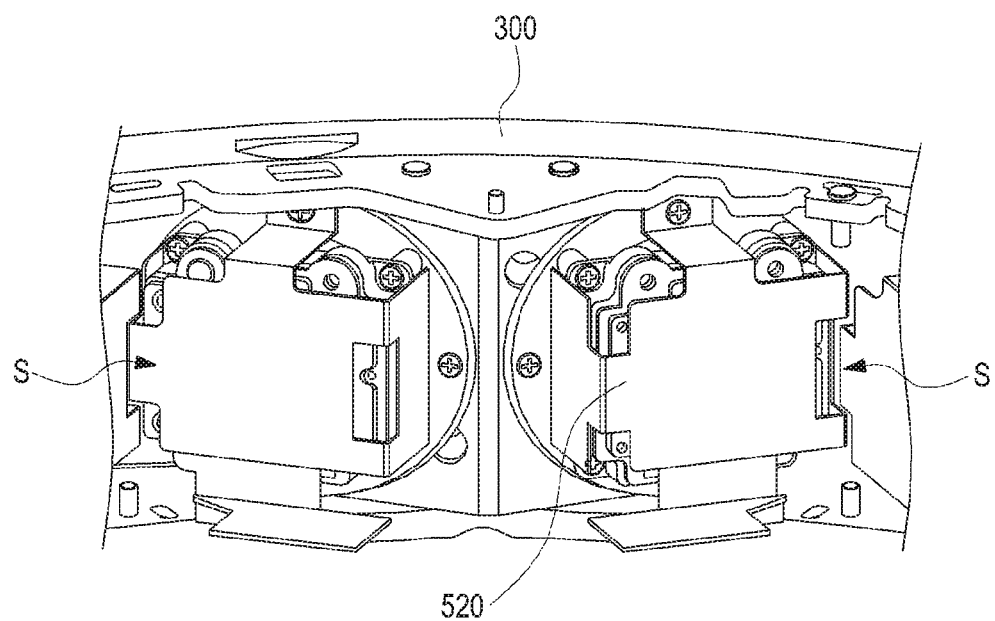
FIG. 9 is a perspective view illustrating a fastened state of cameras directly assembled to a housing, according to an embodiment of the present disclosure.

FIG. 9 is a perspective view illustrating a fastened state of cameras 530 directly assembled to the housing, according to an embodiment of the present disclosure.

The assembling process according to FIGS. 7A and 7B may eliminate the non-fastenable region S, which occurs in the process of individually assembling a camera in each opening in a housing according to the existing technique illustrated in FIG. 9. In the case where cameras are coupled to the inside of the housing, the existing technique may fasten the screws only in the second direction (+Y). In this case, since the interval between the cameras is narrow and the fastening space between the cameras is narrow, a space for using a fastening tool (for example, a screwdriver) cannot be secured, and as a result, it is impossible to completely fasten and seal all regions around the cameras. However, the present disclosure provides a bracket 400 such that the bracket and cameras may be bound to each other in the outside of the housing, then the bracket may be mounted to the inside of the housing, and then the screws may be fastened in the first direction (+X). In this case, a fastening area, which occurs when cameras are directly assembled inside the housing 300, is not required, so that a technician may perform convenient assembly.

FIG. 10 is a cross-sectional view illustrating a waterproof structure of a housing 300, a bracket 400, and second cameras 520, according to an embodiment of the present disclosure.

Figure 11A:
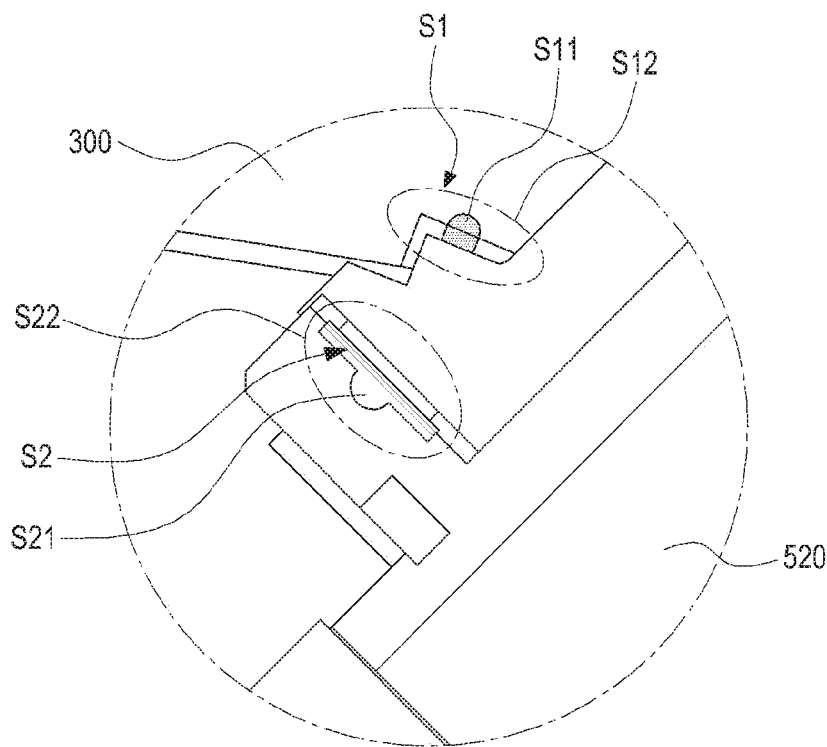
FIGS. 11A and 11B are enlarged views illustrating portions of the waterproof structure of FIG. 10, according to an embodiment of the present disclosure.
Figure 11B:
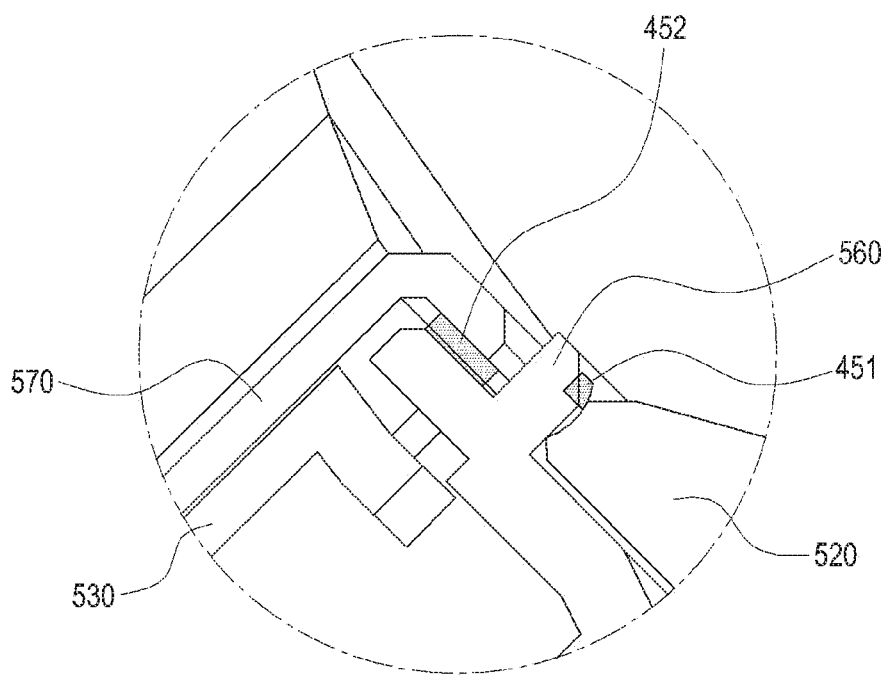

FIGS. 11A and 11B are enlarged views illustrating portions of the waterproof structure of FIG. 10, according to an embodiment of the present disclosure.

Referring to FIGS. 10, 11A, and 11B, in order to implement a waterproof function for blocking the infiltration of water and foreign matter from the periphery of a second cameras 520, a first sealing member S1 may be disposed between the housing 300 and the bracket 400 and a second sealing member S2 may be disposed between the bracket 400 and the second camera 520. In addition, a waterproof member 450 may be disposed on the periphery of the camera housing 530 in order to protect a lens assembly 540.

Referring to a region "A", the first sealing member S1 and the second sealing member S2 may hermetically seal an accommodation space 320 in the housing 300 from the outside of the electronic device 10. A first protrusion S11 protruding to face the second direction (+Y) of the first sealing member S1 may form a first waterproof contact surface S12 while coming into contact with one surface of the housing 300. A second protrusion S21 protruding to face the second direction (−Y) of the second sealing member S2 may form a second waterproof contact surface S22 while coming into contact with one surface of the second camera 520.

According to an embodiment of the present disclosure, the first waterproof contact surface S12 may be formed when the first protrusion S11 of the first sealing member S1 protruding in the second direction (+Y) of the housing 300, for example, toward the first opening 310 in the housing 300 and the first seating recess 340 in the housing 300 come into elastic contact with each other. Since the first surface 421 of the bracket 400 or one surface of the first seating recess 340 of the housing 300 comes into direct contact with the first sealing member S1 having a closed curve shape, an overlap may occur when compressed by fastening. Accordingly, the entry of fluid and foreign matter from the outside may be blocked.

According to an embodiment of the present disclosure, the second waterproof contact surface S22 may be formed when the second protrusion S21 of the second sealing member S2 protruding in the second direction (−Y) of the housing 300, for example, toward the direction opposite to the first protrusion S11 and the second seating recess 432 in the bracket 400 come into elastic contact with each other. Since one surface of the second camera 520 or one surface of the second seating recess 432 of the bracket 400 comes into direct contact with the second sealing member S2 having a closed curve shape, an overlap may occur when compressed. Accordingly, the entry of fluid and foreign matter from the outside may be blocked. The thickness of the second protrusion S21 of the second sealing member S2 may be in the range of 0.1 mm to 0.5 mm.

According to an embodiment of the present disclosure, the first sealing member S1 and the second sealing member S2 have an annular structure. However, the present disclosure is not limited thereto, and the first sealing member S1 and the second sealing member S2 may be formed of an elastic material in various closed curves. In addition, the first sealing member S1 constitutes the first waterproof contact surface due to the first protrusion S11, and the second sealing member S2 constitutes the second waterproof contact surface due to the second protrusion S21. However, the present disclosure is not limited thereto, and a plurality of sealing members or protrusions may be additionally disposed between the housing 300 and the bracket 400 or between the bracket 400 and the second cameras 520 so as to form a third waterproof contact surface and a fourth waterproof contact surface. The additional watertight contact surfaces may further ensure the ingression protection of the electronic device.

Referring to a region "B", a waterproof member 450 may be provided around the lens region of the second camera 520 exposed to the outside, so that the waterproof member 450 may hermetically seal the inner space of the second camera 520 from the outside. The second camera 520 includes, from the inside, a lens assembly 540, a protective member 560 surrounding the lens assembly 540, a camera housing 510, and a fixing member 570 that partially surrounds the outer surfaces of the protective member 560 and a portion of the housing 300.

According to an embodiment of the present disclosure, a first waterproof member 451 may be disposed between the lens assembly 540 and the protective member 560 so as to block the entry of fluid from the outside. The first waterproof member 451 may be treated by waterproof bonding in a closed curve shape. A second waterproof member 452 may be disposed between the front portion of the protective member 560 and the rear portion of the fixing member 570 to block the entry of fluid and foreign matter from the outside. The second waterproof member 452 may be a waterproof tape having a closed curve shape.

By implementing a waterproof structure that surrounds the second camera 520, waterproof performance may be secured, and by mounting the waterproof structure inside the housing, an aesthetically pleasing design may also be secured.

Figure 12A:
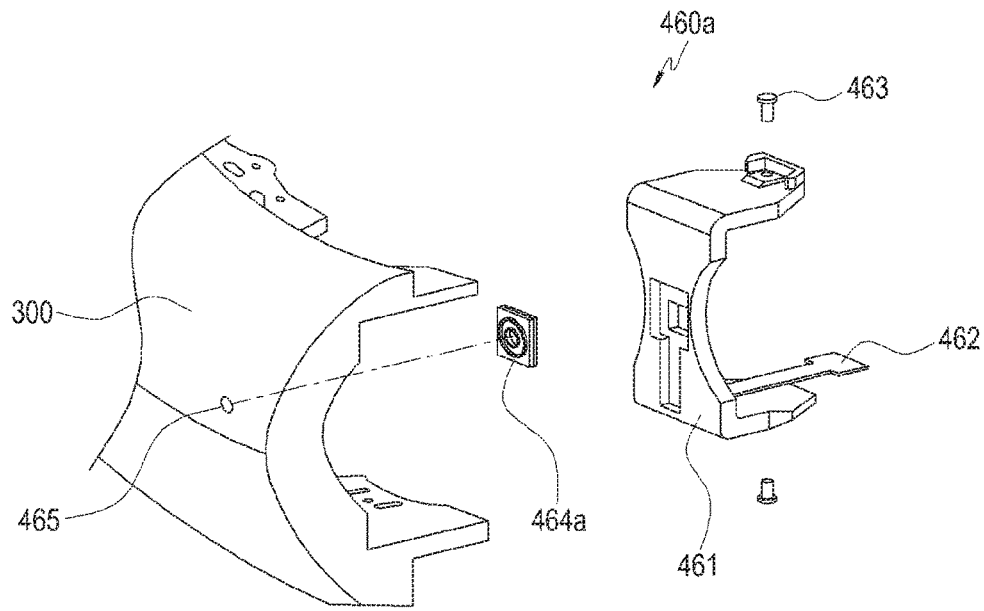
FIGS. 12A and 12B are exploded perspective views illustrating a coupling relationship between a phone holder and a housing, according to an embodiment of the present disclosure.
Figure 12B:
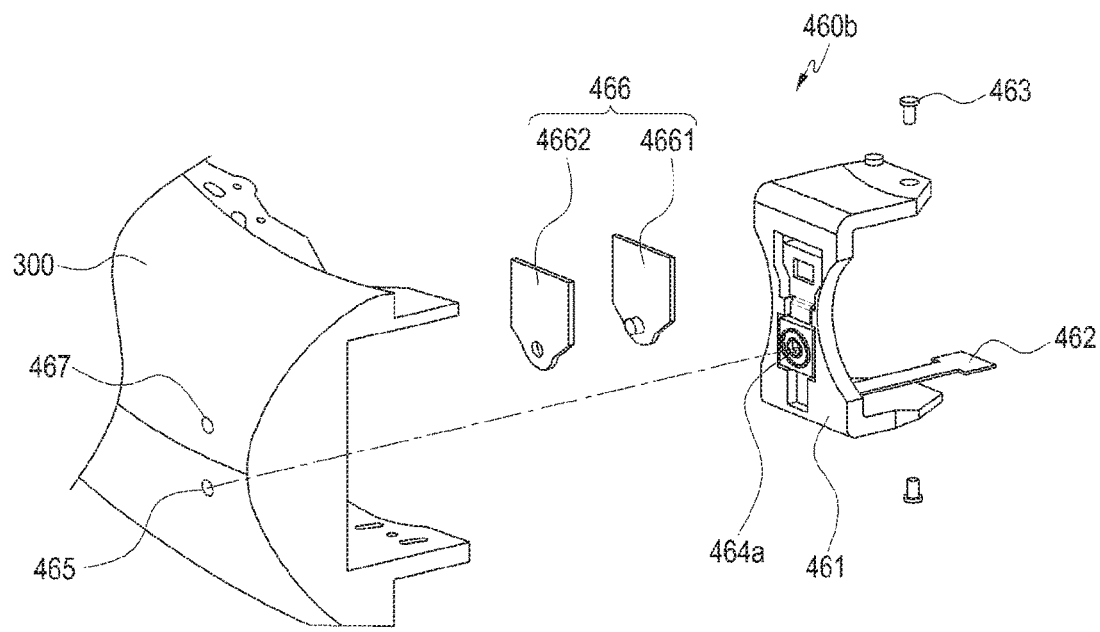

FIGS. 12A and 12B are exploded perspective views illustrating a coupling relationship between a phone holder 460 and the housing 300, according to an embodiment of the present disclosure.

Figures 13A, 13B:
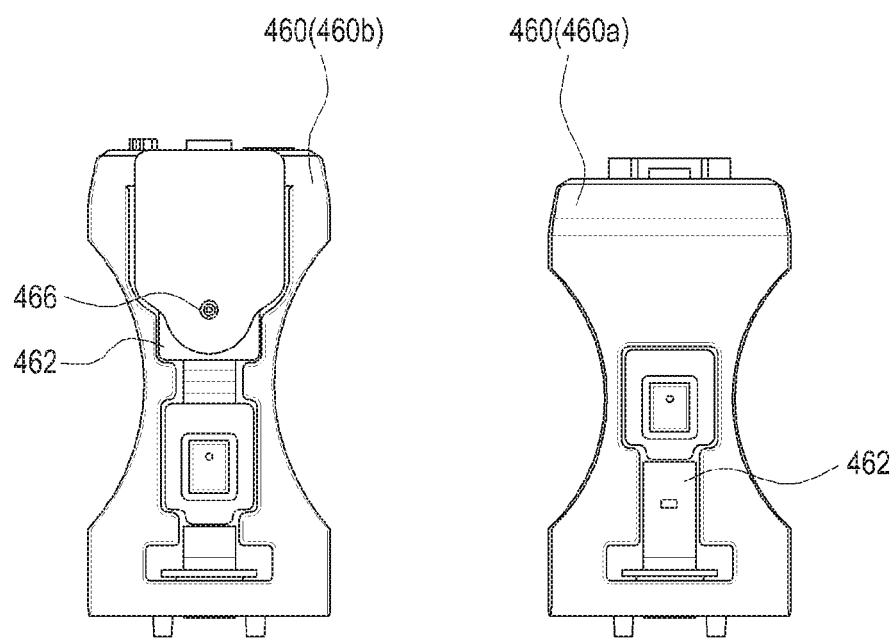
FIGS. 13A and 13B are front views illustrating the phone holder, according to an embodiment of the present disclosure.

FIGS. 13A and 13B are front views illustrating the phone holder 460 according to an embodiment of the present disclosure.

Referring to FIGS. 12A and 12B and FIGS. 13A and 13B, the phone holder 460 may be disposed inside the housing 300 between the plurality of first openings 310. The phone holder 460 includes a first holder 460a, in which a microphone is mounted, and a second holder 460b, in which an illumination unit such as a light emitting diode (LED) is mounted in addition to the microphone. One or more of first holders 460a and one or more of second holders 460b may be disposed, and may be alternately arranged.

According to an embodiment of the present disclosure, the first holder 460a includes a main body 461, a printed circuit board 462 including an integrated circuit of the microphone, fastening members 463, and a third waterproof member 464a. The main body 461 has a shape corresponding to the inner surface of the housing 300 (for example, a "ㄷ" shape). The main body 461 is provided with a recess which is open in one region facing the housing 300, and the printed circuit board 462 may be inserted into the recess. The printed circuit board 462 may extend inside the housing 300, and may be electrically connected to the main printed circuit board 910.

According to an embodiment of the present disclosure, the first holder 460a may be seated inside the housing 300 in the state in which the printed circuit board 462 is mounted on the first holder 460a. Fastening holes may be disposed on the upper surface and/or lower surface of the first holder 460a, and when fastening members 463, such as screws, are fastened to the fastening holes, the housing 300 and the bracket 400 may be bound to each other in which one surface of the second housing 300 and one surface of the bracket 400 face each other.

According to an embodiment of the present disclosure, the third waterproof member 464a may be disposed between the first holder 460a and the housing 300. The housing 300 includes a hole 465 penetrating the housing from the outside so that the user's voice may pass through the hole to be recognized through the microphone. Therefore, since fluid may flow from the outside into the hole 465, the third waterproof member 464a including a protrusion protruding in the second direction (+Y) may be disposed. The waterproof member 464a may be disposed to face the outer surface of the microphone so as to hermetically seal the inner space of the housing 300 from the outside. The protrusion of the third waterproof member 464a may form a waterproof contact surface with the inner surface of the housing 300 so as to protect electronic devices and the like disposed inside the first holder 460a.

According to an embodiment of the present disclosure, the second holder 460b includes a main body 461, a printed circuit board 462 including an integrated circuit of the microphone and the LED, fastening members 463, a third waterproof member 464a, and an illumination structure 466. Components other than the illumination structure 466 are the same as those of the first holder 460a, and thus the descriptions thereof will be omitted.

According to an embodiment of the present disclosure, the illumination structure 466 includes an illumination lens 4661 and an illumination-waterproofing member 4662. A light may be an LED, and the illumination-waterproofing member 4662 may have a shape corresponding to the illumination lens 4661 in order to protect the illumination lens 4661 from water and foreign matter ingression.

According to an embodiment of the present disclosure, the housing 300 includes a hole 467 open to the outside so as to provide light to the outside during the operation of the electronic device 10 having the illumination structure 466 to allow the user to recognize whether the electronic device 10 is operating. Since fluid may flow from the outside into the hole 467, the illumination-waterproofing member 4662 may be disposed in a manner to surround the light. The illumination-waterproofing member 4662 may be disposed to face the outer surface of the illumination lens 4661 to hermetically seal the inner space of the housing 300 from the outside. The second holder 460b including the illumination structure may be disposed along the periphery of the electronic device 10 according to an interval that allows the user to confirm whether the electronic device 10 is operating.

Figure 14:
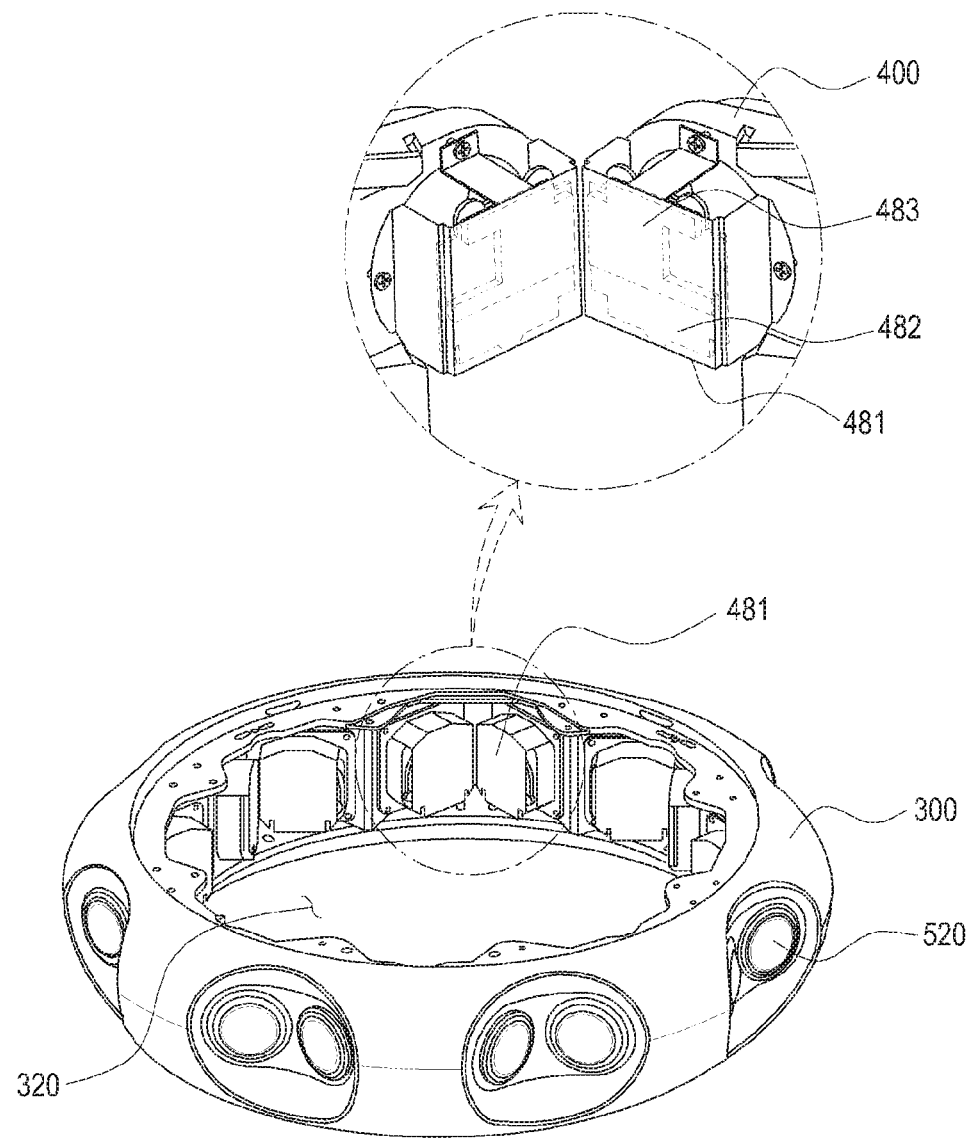
FIG. 14 is a perspective view illustrating rear surfaces of second cameras that are formed with a heat radiation structure, according to an embodiment of the present disclosure.

FIG. 14 is a perspective view illustrating rear surfaces of second cameras 520 that are formed with a heat radiation structure 480, according to an embodiment of the present disclosure.

Referring to FIG. 14, a heat radiation plate 481 may be disposed on the rear surface of each second camera 520 so as to radiate heat generated from the second camera 520 to the outside. The heat radiation plates 481 may be formed to respectively cover the entire rear portions of the second cameras 520, which are not inserted into the second openings 410 in the bracket 400.

According to an embodiment of the present disclosure, on each of the rear surfaces of the second cameras 520 seated on the housing 300 and the bracket 400, various sensors for camera operation, a printed circuit board 482 on which the sensors are disposed, a thermal interface material (TIM) 483, and a heat radiation plate 481 may be stacked one on another. The heat radiation plate 481 is disposed to be connected to the bracket 400, and one surface of the heat radiation plate 481 and one surface of the bracket 400 may be provided therein with fastening holes, so that when fastening members, such as screws, are fastened into the fastening holes, the heat radiation plate 481 and the bracket 400 may be bound to each other and facing each other through the connection portion.

According to an embodiment of the present disclosure, the heat radiation plate 481 may be, for example, a copper (Cu) plate that has excellent heat transfer performance, and the printed circuit board 482 may be made using a metal board that is formed of aluminum, copper, or iron, which is excellent in heat transfer performance, and may have an insulating layer and a copper wiring layer formed thereon. Further, the bracket 400 may include aluminum (Al), and the housing 300 may include polycarbonate (PC).

According to an embodiment of the present disclosure, the transfer path of heat from the second camera 520, which is surrounded by the heat radiation plate 481, may be formed such that the heat generated by the sensors of the second camera 520 may be transferred to the heat radiation plate 481 via the printed circuit board 482 and the TIM 483. The heat transferred to the heat radiation plate 481 may be transferred to the outer surface of the bracket 400 through the fastening structure, may then be transferred to the housing 300 surrounding the bracket 400, and may then be radiated to the outside. The heat is rapidly diffused to the outside so as to limit the temperature increase inside the housing 300, so the malfunction of the device may be reduced.

According to an embodiment of the present disclosure, the heat radiation structure 480 may be installed in all the second cameras 520 disposed in the housing 300, and the amount of heat, which is generated from the sensors of the second cameras 520 and the like and introduced into the accommodation space 320 inside the housing 300, may be minimized.

Figure 15:
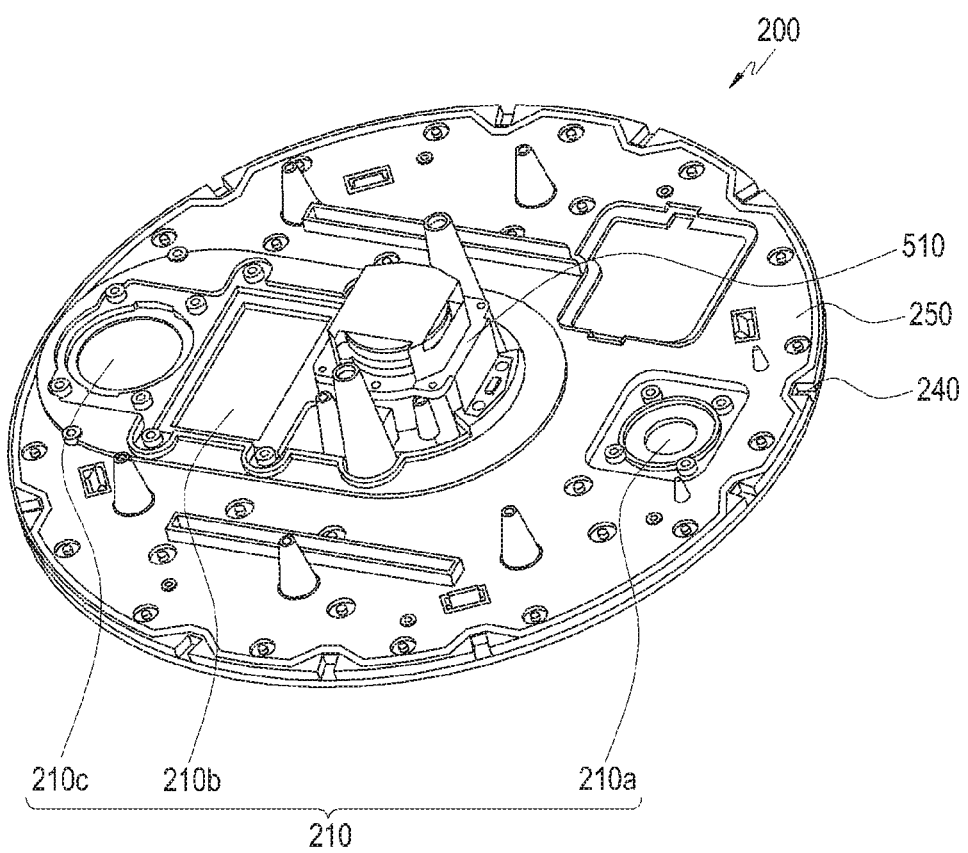
FIG. 15 is a perspective views illustrating a rear surface of an upper cover unit, according to an embodiment of the present disclosure.

FIG. 15 is a perspective views illustrating a rear surface of an upper cover unit 200 according to an embodiment of the present disclosure.

Figure 16:
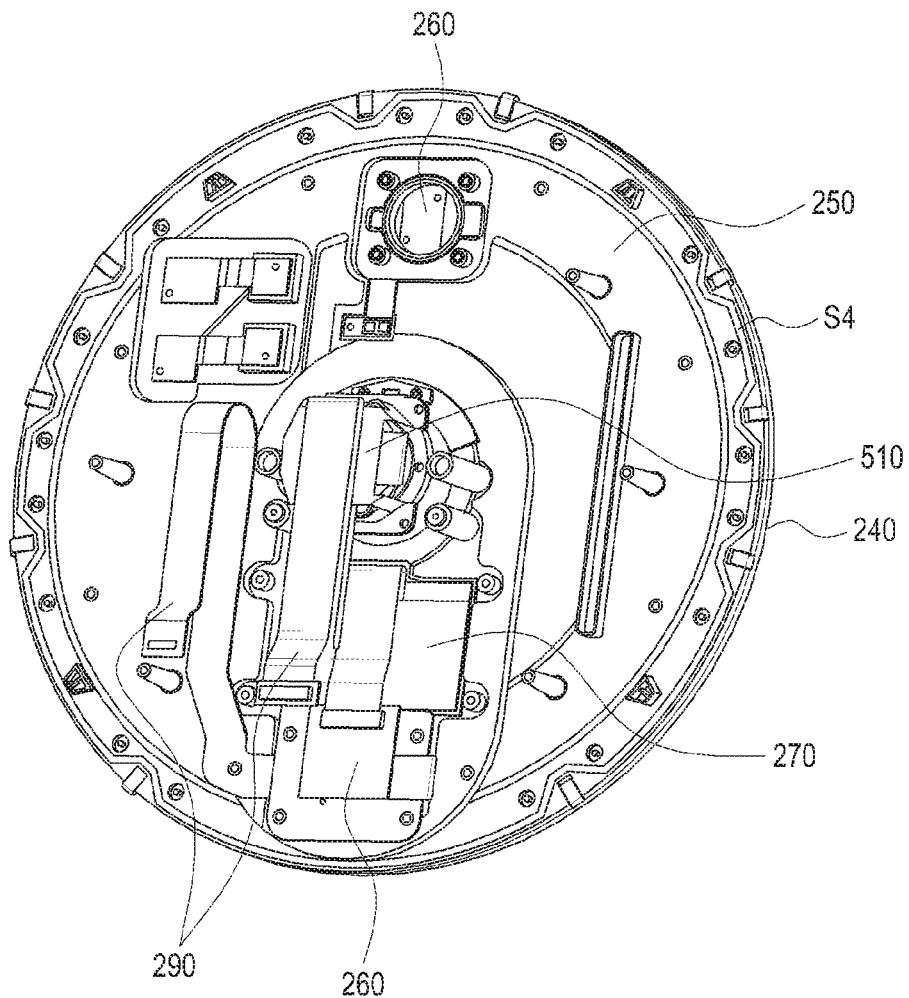
FIG. 16 is a perspective view illustrating electronic components which are disposed on a rear surface of the upper cover unit of FIG. 15, according to an embodiment of the present disclosure.

FIG. 16 is a perspective view illustrating electronic components which are disposed on the rear surface of the upper cover unit of FIG. 15, according to an embodiment of the present disclosure.

Figure 17:
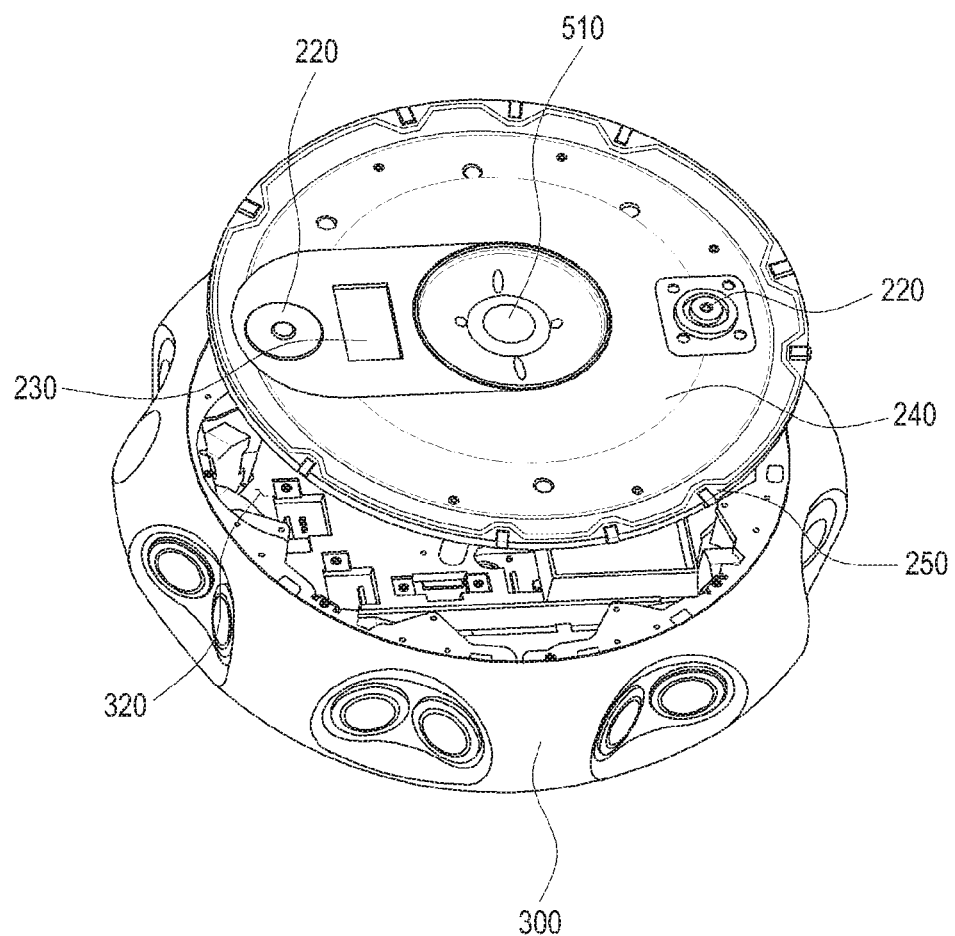
FIG. 17 is a projected perspective view illustrating the upper cover unit coupled to the electronic device, according to an embodiment of the present disclosure.

FIG. 17 is a projected perspective view illustrating the upper cover unit 200 coupled to the electronic device 10, according to an embodiment of the present disclosure.

Referring to FIG. 2 and FIGS. 15 to 17, the upper cover unit 200 may be disposed on the upper side of the housing 300, and includes one or more holes 210 in a first direction (+X), and the first camera 510, the data output unit 230, such as a display device, and the data input unit 220, such as a keypad, may be exposed to the outside through the hole 210.

According to an embodiment of the present disclosure, the upper cover unit 200 includes a first cover portion 240 disposed at the outermost portion of the electronic device 10, and a second cover portion 250 disposed to be stacked with the first cover portion 240. The first cover portion 240 and the second cover portion 250 may have the holes 210, which are disposed at corresponding positions therein, so as to expose the various electronic devices assembled from the inside to the outside.

According to an embodiment of the present disclosure, the third sealing member S3 may be disposed between the first cover portion 240 and the second cover portion 250 so as to implement a waterproof structure that blocks the entry of external fluid, and the fourth sealing member S4 may be disposed at the lower end of the second cover portion 250 so as to implement a waterproof structure that prevents the entry of external fluid when the sealing member S4 is coupled with the housing 300.

According to an embodiment of the present disclosure, the first camera 510 may be disposed in the center of the upper cover unit 200 to be exposed to face the first direction (+X). Since the configuration of the first camera 510 is the same as that of the second camera 520 described above, descriptions thereof will be omitted. The first camera 510 may be disposed in the center of the upper cover portion 200 so as to capture images and/or video images above the electronic device 10, and the first camera 510 may be associated with the plurality of second cameras 520 so as to effectively acquire three-dimensional images. However, the number and arrangement of the second cameras 520 is not limited, and the number and arrangement of the second cameras may vary to be capable of effectively acquiring three-dimensional images.

Referring to FIGS. 16 and 17, various electronic components may be inserted into or seated in one or more holes 210 and recess portions disposed on the rear surface of the upper cover unit 200 of FIG. 15. A keypad 260 for a record function may be mounted inside a first hole 210a disposed at one side of the first camera 510, and the keypad 260 may be exposed to the outside through the first hole 210a so that the user may perform an operation of starting and stopping recording.

According to an embodiment of the present disclosure, a display device 270 capable of confirming or controlling various operations of the electronic device 10 is mounted inside a second hole 210b disposed at the other side of the first camera 510, and the display device 270 may include a window member made of a tempered glass material and a display panel mounted on the inner surface of the window member. A touch panel may be mounted between the window member and the display panel. The display device 270 may be an output device for outputting a screen, and may be used as an input device equipped with a touchscreen function. The window member may close the opened front (second hole) of the upper cover unit 200.

According to an embodiment of the present disclosure, a keypad 260 including a mechanically operated button or a touch key may be provided inside a third hole 210c arranged parallel to the display device 270. The keypad 260 may generate an input signal by the user's body contact. The keypad 260 may include a 4-way key that is capable of controlling a direction. The keypad 260 may be implemented with only mechanical buttons or with only the touch keys.

According to an embodiment of the present disclosure, the first camera 510, the display device 270 and/or the keypad 260 includes connectors 290 that may be electrically connected to various circuit devices, which are disposed within the housing 300, for example, the processor 120, the memory 130, the input/output interface 150, the communication interface 170, and the like, which were described above and are illustrated in FIG. 1. The connectors 290 may include a flexible printed circuit board, and may be formed in various lengths within the accommodation space 320 in the housing 300 to be fastened while forming a stable contact point with a main printed circuit board 910 and/or a sub printed circuit board 920.

Figure 18A:
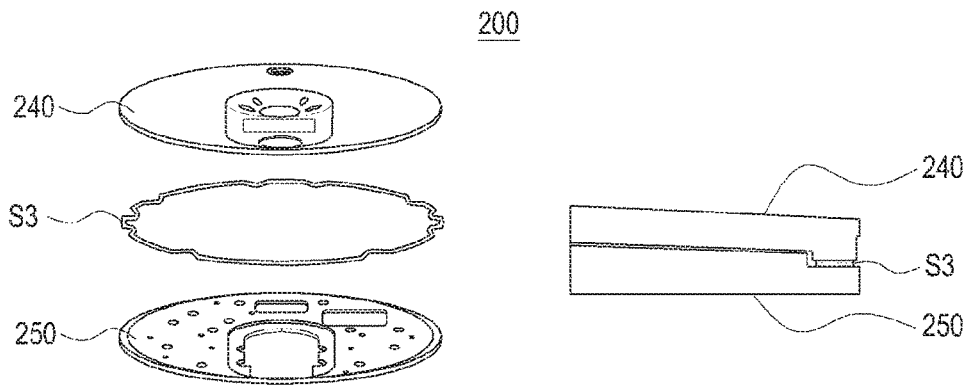
FIGS. 18A and 18B illustrate an exploded perspective view and a cross-sectional view of a waterproof structure of the upper cover, according to an embodiment of the present disclosure.
Figure 18B:
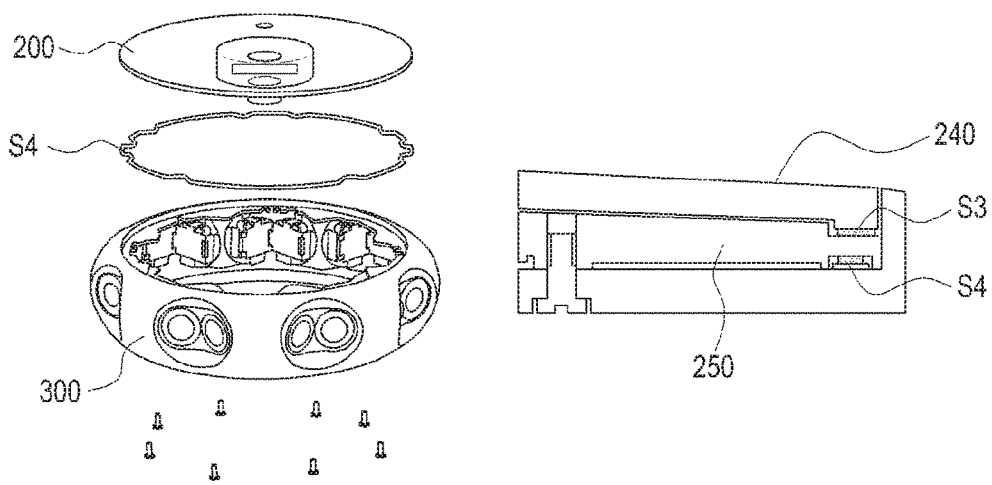

FIGS. 18A and 18B illustrate a waterproof structure of the upper cover unit 200, according to an embodiment of the present disclosure, in which each of FIGS. 18A and 18B illustrates an exploded perspective view and a cross-sectional view.

Referring to FIGS. 18A and 18B, the upper cover unit 200 includes the first cover portion 240 disposed at the outermost portion of the electronic device 10, and the second cover portion 250 disposed below the first cover portion 240. The first cover portion 240 and the second cover portion 250 may be manufactured in sizes that correspond to each other. The third sealing member S3 may be disposed between the first cover portion 240 and the second cover portion 250. A ring-shaped recess may be disposed on the edge of the top surface of the second cover portion 250, and the third sealing member S3 may be seated in the recess. The third sealing member S3 may be a waterproof tape having a closed curve shape. When the third sealing member S3 is seated, a protrusion disposed on the edge of the first cover portion 240 may be coupled while compressing the third sealing member S3, thereby blocking the entry of fluid and foreign matter from the outside. The thickness of the third sealing member S3 may be in the range of 1.0 mm to 2.0 mm.

According to an embodiment of the present disclosure, the fourth sealing member S4 may be disposed between the second cover portion 250 and the housing 300. For example, a ring-shaped recess may be disposed on the edge of the bottom surface of the second cover portion 250, and the fourth sealing member S4 may be seated in the recess. The fourth sealing member S4 may be a waterproof tape having a closed curve shape, and may have a height in the range of 0.3 mm to 1.0 mm. When the fourth sealing member S4 is seated in the recess in the second cover portion 250, the fourth sealing member S4 comes into contact with the edge of the top surface of the housing 300, and the second cover portion 250 may be coupled while compressing the fourth sealing member S4, thereby blocking the entry of fluid and foreign matter from the outside.

According to an embodiment of the present disclosure, after the fourth sealing member S4 is disposed between the second cover portion 250 and the housing 300, the second cover portion 250 and the housing 300 may be coupled to each other. For example, fastening holes may be disposed to penetrate the step 330 of the housing 300 and one surface of the second cover portion 250, and when fastening members, such as screws, are fastened into the fastening holes, the housing 300 and the second cover portion 250 may be bound to each other in the state in which one surface of the housing 300 and one surface of the second cover portion 250 face each other.

Figure 19A:
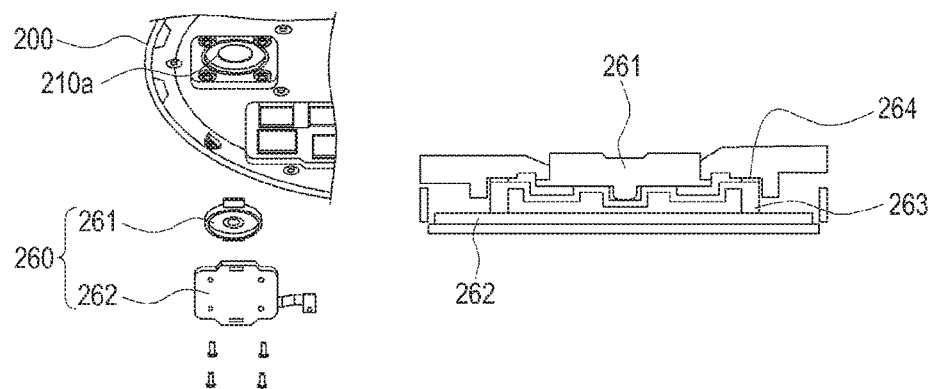
FIGS. 19A and 19B illustrate an exploded perspective view and a cross-sectional view of a coupling and waterproof structure of a keypad of the upper cover unit, according to an embodiment of the present disclosure.
Figure 19B:
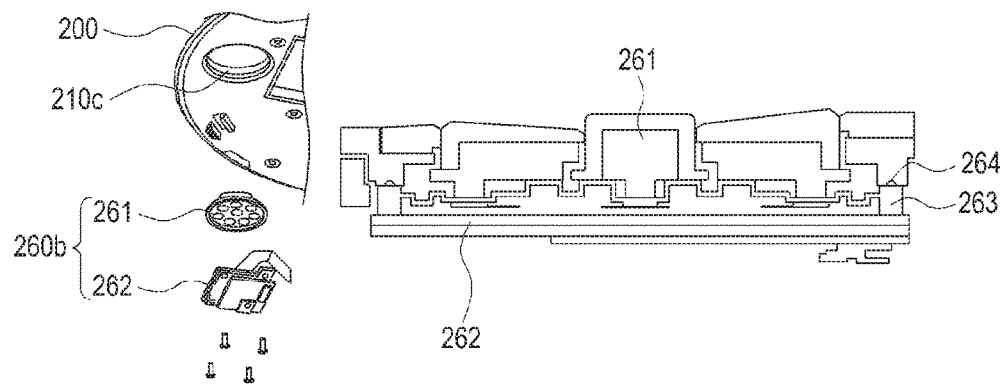

FIGS. 19A and 19B illustrate an exploded perspective view and a cross-sectional view of a coupling and waterproof structure of a keypad 260 of the upper cover unit 200, according to an embodiment of the present disclosure.

Referring to FIGS. 19A and 19B, the upper cover unit 200 includes a key and/or a keypad 260 exposed in the first hole 210a and the third hole 210c. According to an embodiment of the present disclosure, the keypad 260 exposed in the first hole 210a may be a keypad for a recording function, and the keypad 260b exposed in the third hole 210c may be a keypad 260b for a direction change.

According to an embodiment of the present disclosure, the keypad 260 includes a key button 261 and a key plate 262. The key button includes a protrusion 263 protruding in the first direction (+X). One or more protrusions 263 may be formed, and may be disposed to be in contact with a waterproof member 264 to be described later, at the center of the key button 261, so that pressure applied from the outside may be directly transmitted to the inside of the main body.

According to an embodiment of the present disclosure, the keypad includes a waterproof member 264 disposed to be in contact with the protrusion 263 of the keypad 260. The waterproof member 264 may hermetically seal the inside of the electronic device 10 from the first hole 210a or the third hole 210c exposed to the outside.

According to an embodiment of the present disclosure, when the key button 261 of the keypad 260 is operated, the portion in contact with the lower protrusion 263 of the waterproof member 264 made of an elastic material may move in the first direction (+X), so that the pressure transmitted to the protrusion 263 may be transmitted to a dome button and the like. The pressure transmitted to the dome button and the like may be provided to the printed circuit board, and the printed circuit board may convert the pressure transmitted from the dome button into an electrical signal.

According to an embodiment of the present disclosure, after the waterproof members 264 are disposed on the keypads 260 disposed inside the first hole 210a and the third hole 210c in the upper cover unit 200, the keypad 260 and the upper cover unit 200 may be coupled to each other. Fastening holes may be provided to penetrate one surface of the second cover portion 250 and one surface of the keypad 260, and when fastening members, such as screws, are fastened into the fastening holes, the second cover portion 250 and the keypad 260 may be bound to each other in a state in which the one surface of the second cover portion 250 and the one surface of the keypad 260 face each other.

Figure 20A:
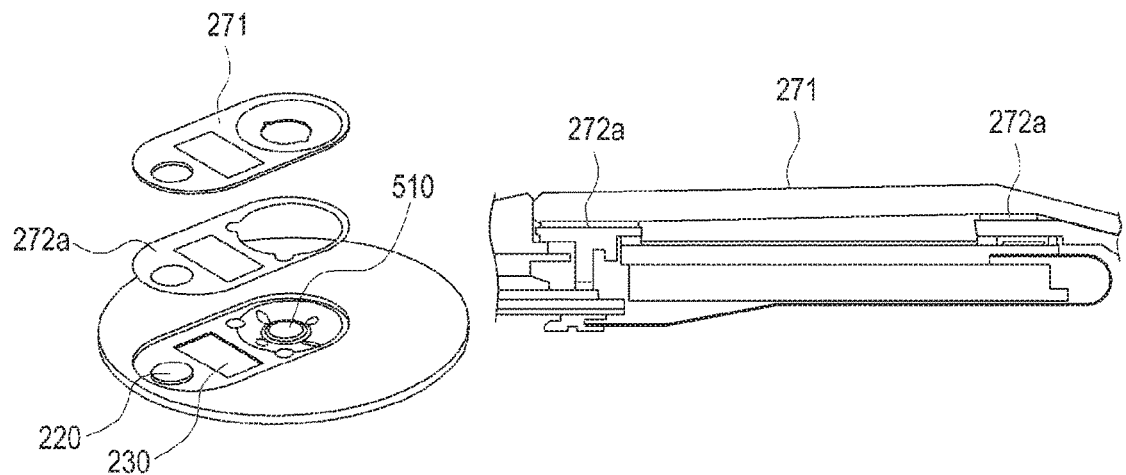
FIGS. 20A and 20B illustrate an exploded perspective view and a cross-sectional view of a coupling and waterproof structure of a first camera and an input/output unit of the upper cover unit, according to an embodiment of the present disclosure.
Figure 20B:
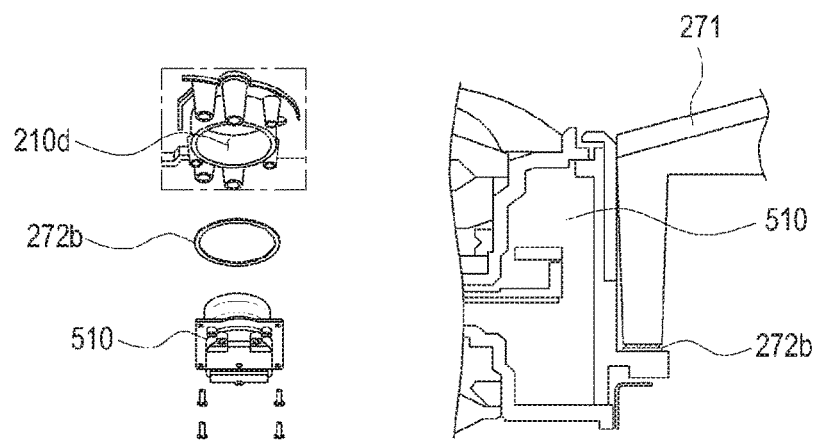

FIGS. 20A and 20B illustrate an exploded perspective view and a cross-sectional view of a coupling and waterproof structure of the first camera 510 and the input/output units 220 and 230 of the upper cover unit 200, according to an embodiment of the present disclosure.

Referring to FIGS. 20A and 20B, a window member 271 may be disposed on the top surface of the upper cover unit 200. The window member 271 may be disposed on a region covering the top surfaces of the first camera 510 and the input/output units 220 and 230.

According to an embodiment of the present disclosure, one or more holes may be formed in the upper surface of the upper cover unit 200 to expose the first camera 510 and the input/output units 220 and 230 to the outside. A waterproof member 272a may be disposed on the entire lower surface of the window member 271 to block the entry of fluid and foreign matter from the outside through the holes.

Referring to FIG. 20A, the waterproof member 272a may have a shape corresponding to the window member 271, and may surround the peripheries of the region where the keypad is formed, the region where the display is disposed, and the region where the first camera 510 is exposed. The waterproof member 272a may be a waterproof tape having a closed curve shape and including an elastic material. When the waterproof member 272 is seated on the upper surface of the first cover portion 240, the window member 271 may be coupled while compressing the waterproof member 272a.

According to an embodiment of the present disclosure, the waterproof member 272a may be disposed between the first camera 510 and the upper cover unit 200. A ring-shaped seating space is provided on the step formed in the peripheral portion of the first camera 510, and the waterproof member 272a may be seated in the seating space. The waterproof member 272a may be a waterproof tape having a closed curve shape, and its height may be in the range of 0.1 mm to 0.5 mm. When the waterproof member 272a is seated in the seating space around the first camera 510, the waterproof member 272a comes into contact with a portion of the bottom surface of the upper cover unit 200, and the window member 271 may be coupled while compressing the waterproof member 272a, thereby blocking the entry of fluid and foreign matter from the outside.

Referring to FIG. 20B, the first camera 510 and the second camera 520 may be coupled to each other after the waterproof member 272b is disposed between one surface of the upper cover unit 200 and one surface of the first camera 510. For example, fastening holes may be provided to pass through one surface of the first camera 510 and one surface of the upper cover unit 200, and when fastening members, such as screws, are fastened to the fastening holes, the first camera 510 and the upper cover unit 200 may be bound to each other in a state in which the one surface of the first camera 510 and the one surface of the upper cover unit 200 face each other.

Figure 21A:
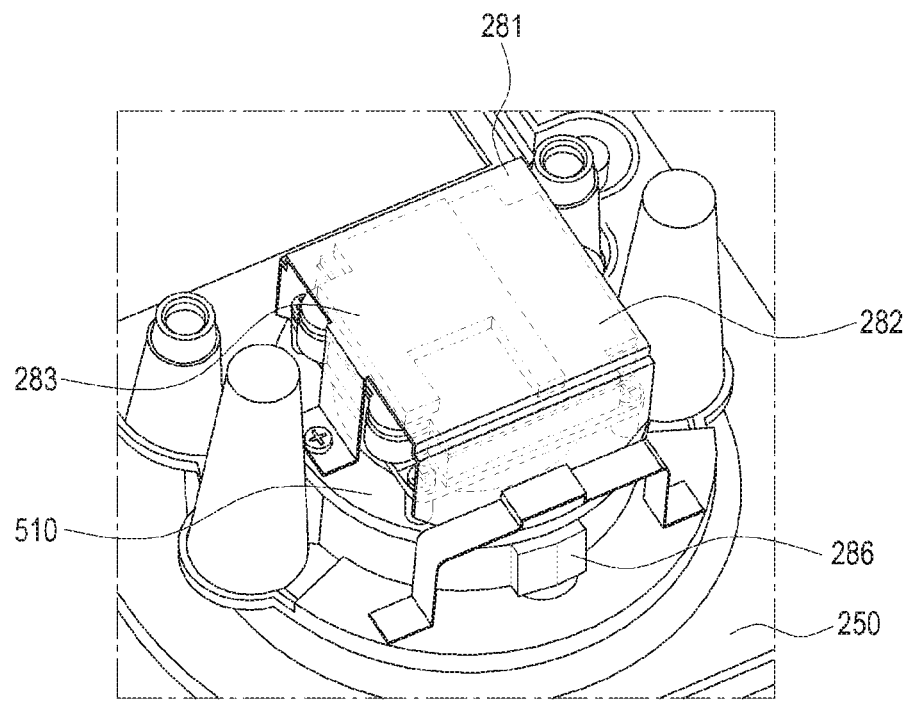
FIGS. 21A and 21B are perspective views illustrating a rear surface of a first camera that is formed with a heat radiation structure, according to an embodiment of the present disclosure.
Figure 21B:
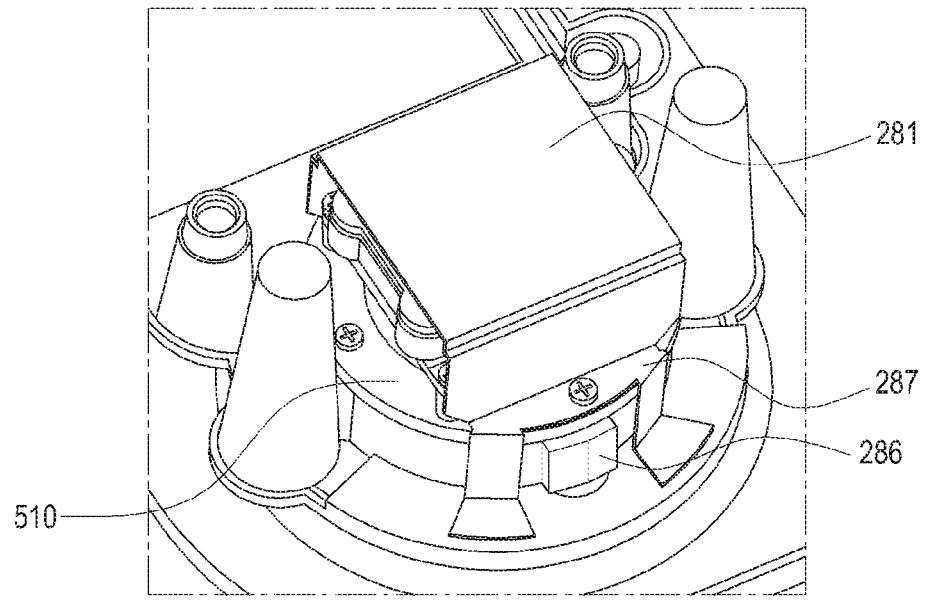

FIGS. 21A and 21B are perspective views illustrating a rear surface of a first camera 510 that is formed with a heat radiation structure, according to an embodiment of the present disclosure.

Referring to FIGS. 21A and 21B, a heat radiation plate 281 may be disposed on the rear surface of the first camera 510 so as to radiate heat generated from the first camera 510 to the outside. The heat radiation plate 281 may be formed to cover at least a portion of the rear portion of the first camera 510, which is not inserted into the fourth hole 210d in the upper cover unit 200 illustrated in FIG. 20B.

According to an embodiment of the present disclosure, on the rear portion of the first camera 510 seated in the fourth hole 210d in the upper cover unit 200, various sensors for camera operation, a printed circuit board 282 on which the sensors are disposed, a TIM 283, and a heat radiation plate 281 may be stacked one on another. As another example, the heat radiation plate 281 is disposed to be connected to the second cover portion 250, and one surface of the heat radiation plate 281 and one surface of the second cover portion 250 may be provided with fastening holes, so that when fastening members such as screws are fastened into the fastening holes, the heat radiation plate 281 and the second cover portion 250 may be bound to each other and facing each other.

As illustrated in FIG. 21A, after the first camera 510 is assembled to the upper cover unit 200, a copper (Cu) sheet may be additionally disposed on the edge of the rear surface of the first camera 510 (a portion adjacent to a sensor and the like) to be connected to the second cover portion 250 in order to improve heat radiation performance. As still another example, in order to improve the heat radiation performance, the shape of the contact portion 286 may extend along the side surface of the first camera 510 at an edge portion thereof so as to form a wide contact surface around the first camera 510 of the second cover portion 250.

As illustrated in FIG. 21B, in order to improve heat radiation performance by forming a wide contact surface around the first camera 510 in the second cover portion 250, the shape of the contact portion 286 may be formed such that the contact portion 286 is connected to the heat radiation plate 281 disposed on the rear surface of the first camera 510 by being in contact with the heat radiation plate 281, and the plate 287 may be disposed so as to make the first camera 510 and the second cover unit 250 come into direct contact with each other.

According to an embodiment of the present disclosure, the heat radiation plate 281 may be, for example, a copper (Cu) plate has excellent heat transfer performance, and the printed circuit board 282 may be made using a metal board that is formed of aluminum, copper, or iron, which has excellent heat transfer performance, and may have an insulating layer and a copper wiring layer formed thereon. In addition, the upper cover unit 200 may include aluminum (Al) or polycarbonate (PC).

According to an embodiment of the present disclosure, the transfer path of heat from the first camera 510, which is surrounded by the heat radiation plate 281, may be such that the heat generated by the sensors of the first camera 510 may be transferred to the heat radiation plate 281 via the printed circuit board 282 and the TIM 283. The heat transferred to the heat radiation plate 281 may transfer to the outer surface of the second cover portion 250 through the fastening structure, may then transfer to the first cover portion 240 disposed above the second cover portion 250, and may then be radiated to the outside. The heat is rapidly diffused to the outside along the heat transfer path to reduce the temperature rise inside the housing 300, so that the malfunction of the device may be reduced. In addition, the heat radiation structure may minimize entry of the heat generated by the sensors and the like of the first camera 510 into the accommodating space 320 within the housing 300.

Figure 22:
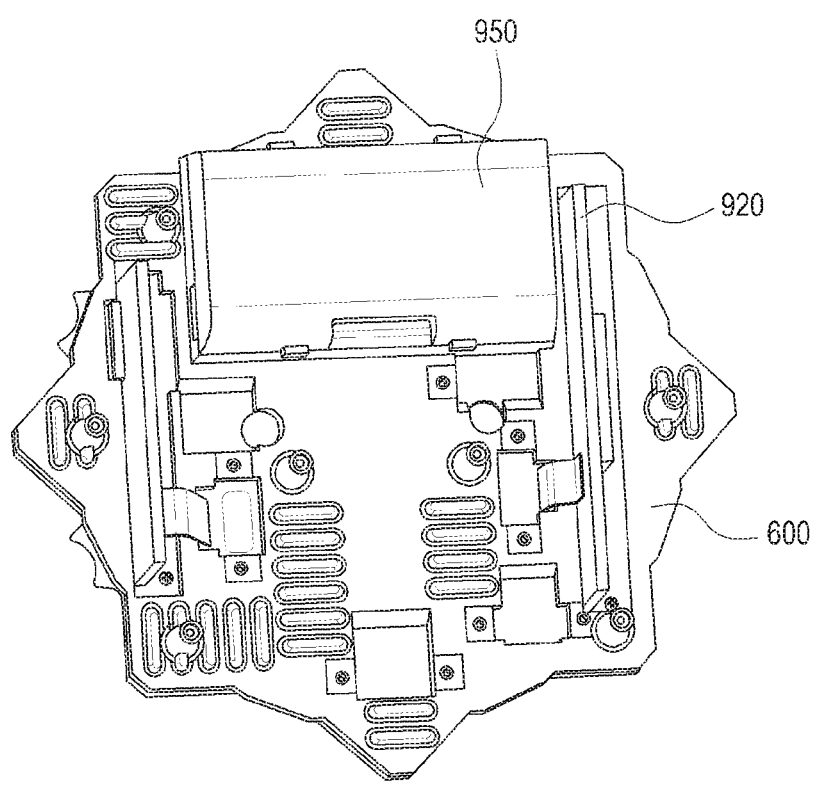
FIG. 22 is a perspective view illustrating a top surface of a first support member on which a printed circuit unit is mounted, according to an embodiment of the present disclosure.

FIG. 22 is a perspective view illustrating a top surface of a first support member 600 on which a printed circuit unit 900 is mounted, according to an embodiment of the present disclosure.

Figure 23:
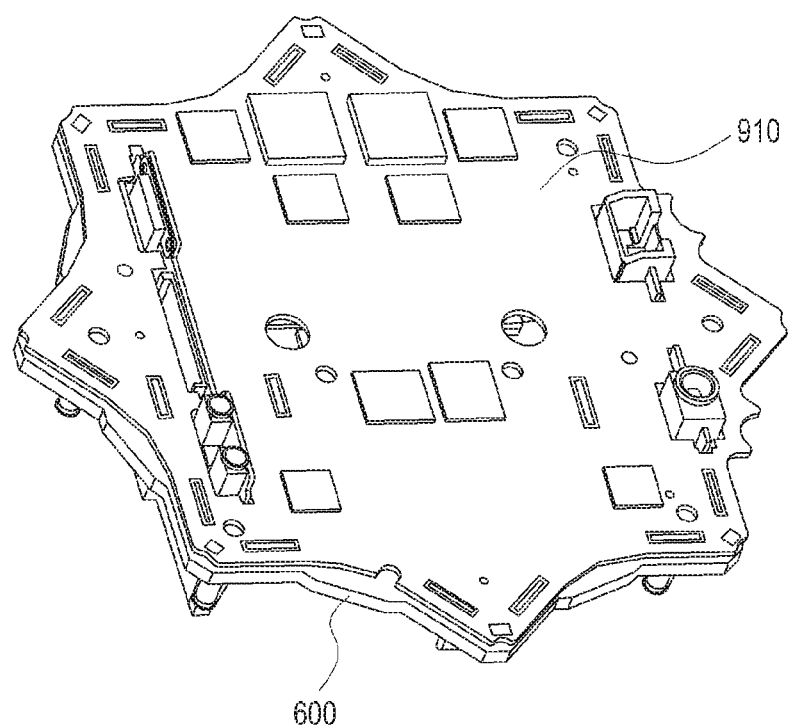
FIG. 23 is a rear perspective view illustrating a structure of the first support member on which the printed circuit unit is mounted, according to an embodiment of the present disclosure.

FIG. 23 is a rear perspective view illustrating the structure of the first support member 600 on which the printed circuit unit 900 is mounted, according to an embodiment of the present disclosure.

Figure 24:
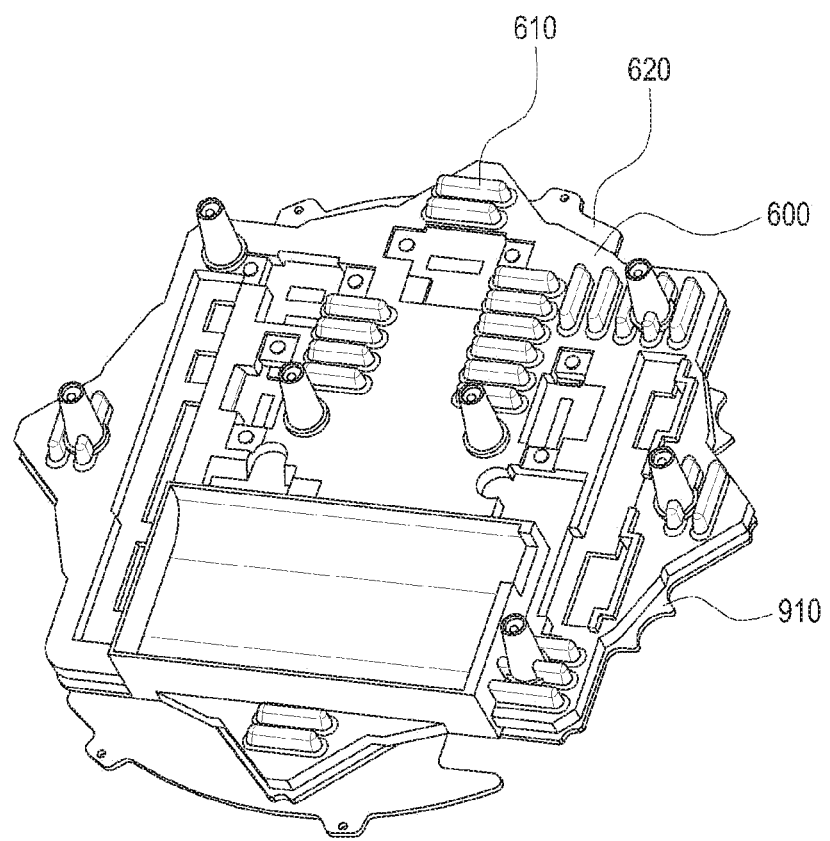
FIG. 24 is a front perspective view illustrating the structure of the first support member for heat radiation of a printed circuit unit, according to an embodiment of the present disclosure.

Referring to FIGS. 23 and 24, the first support member 600 may be made of a metallic material and/or a plastic material, and may provide a space in which various electronic components may be mounted, so that at least one printed circuit unit 900 and/or a battery 950 may be accommodated therein.

According to an embodiment of the present disclosure, the printed circuit unit 900 includes a main printed circuit board 910 disposed on the lower front surface of the first support member 600, and a sub-printed circuit board 920 disposed vertically on the first support member 600. The first support member 600 may be provided with at least one hole in a space in which the sub-printed circuit board 920 is seated to electrically connect the sub-printed circuit board 920 and the main print circuit board 910 to each other.

According to an embodiment of the present disclosure, the main printed circuit board 910 and the sub-printed circuit board 920 may be configured such that a processor, a communication module, various interfaces, a power management module, and the like may be mounted in the form of integrated circuit chips, and a control circuit may also be configured with integrated circuit chips to be mounted on the printed circuit boards 910 and 920. The control circuit may be a portion of the above-described processor or communication module.

According to an embodiment of the present disclosure, a space for accommodating a battery 950 may be formed above the first support member 600. The battery 950 is disposed at the upper side of the main printed circuit board 910 and/or the lateral side of the sub-printed circuit board 920, and provides power to various components of the electronic device 10. The battery 950 may be selected from among various types that supply power, and may be charged in a wired or wireless manner.

FIG. 24 is a front perspective view illustrating the structure of the first support member 600 for heat radiation of the printed circuit unit 900, according to an embodiment of the present disclosure.

Figure 25:
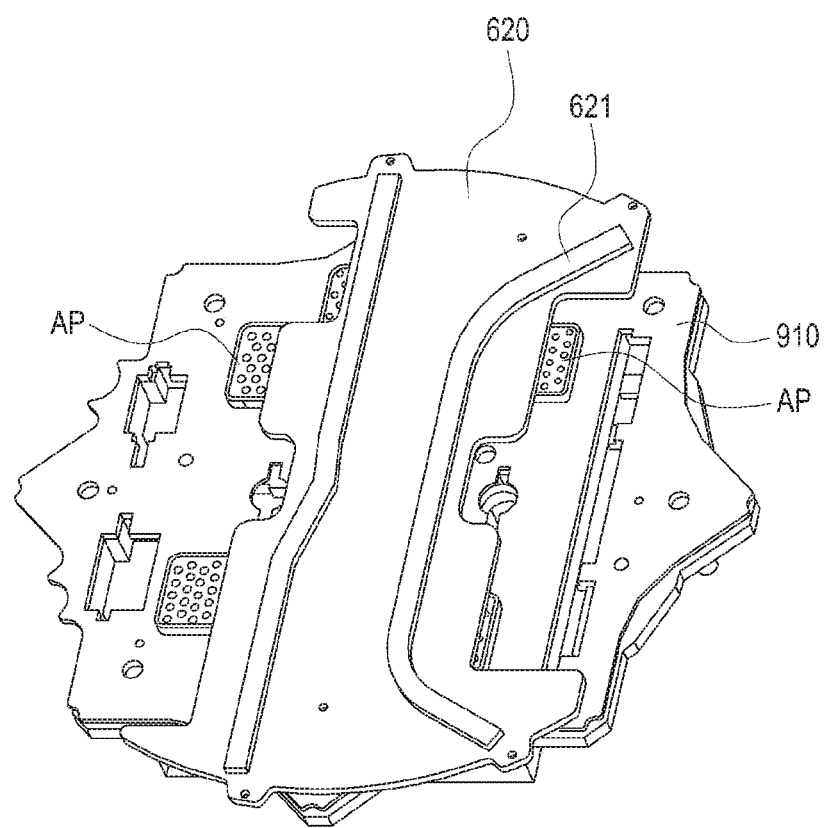
FIG. 25 is a rear perspective view illustrating the structure of the first support member for heat radiation of a printed circuit unit, according to an embodiment of the present disclosure.

FIG. 25 is a rear perspective view illustrating the structure of the first support member 600 for heat radiation of the printed circuit unit 900, according to an embodiment of the present disclosure.

Referring to FIGS. 24 and 25, at least one heat radiation fin structure 610 may be provided on the upper surface of the first supporting member 600, and at least one heat radiation plate structure 620 may be provided on the bottom surface of the first support member 600.

According to an embodiment of the present disclosure, the heat radiation fin structure 610 may increase the surface area of the first support member 600 so as to radiate heat generated from the printed circuit unit 900, which is disposed at the lower side or the lateral side of the first support member, to the outside. The heat radiation fin structure 610 may be integrally formed with the first support member 600, and may be disposed adjacent to a hole in the first support member 600, which is disposed for connector connection. The heat radiation fin structure 610 is designed to have fin shapes having the same height in regions of the first support member 600. However, without being limited thereto, the number and arrangement of heat radiation fins may be variously changed so as to improve the heat radiation performance.

According to an embodiment of the present disclosure, the heat radiation plate structure 620 may be disposed in a plate form to be in contact with the lower portion of the main printed circuit board 910, and include a heat pipe 621 therein. For example, a line of the heat pipe 621 may be disposed to interconnect the lower portions of AP chips, which are the main heat generating sources of the main printed circuit board 910, and one or more lines may be formed.

According to an embodiment of the present disclosure, the heat generated in the main printed circuit board 910 may be cooled by causing air and/or fluid to flow into the heat pipe 621 of the heat radiation plate structure 620. A heat radiation fin may be further disposed around the heat pipe 621 so as to improve the heat radiation performance. The heat radiation plate structure 620 may be configured with two pipes below the first support member 600 to be in contact with the AP chips. However, without being limited thereto, the number of pipes may be variously changed, and may be disposed in other regions.

Figure 26A:
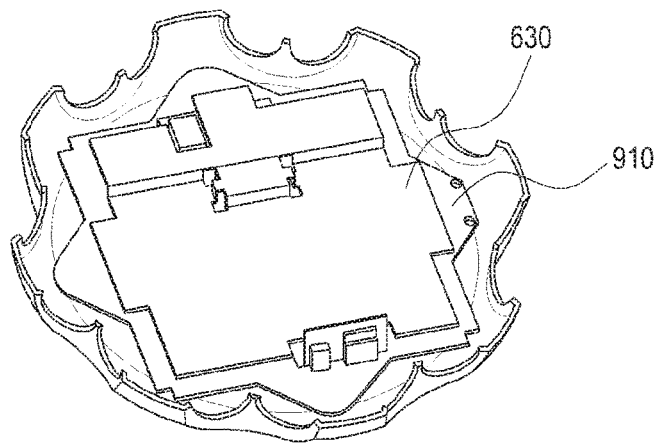
FIGS. 26A, 26B, and 26C illustrate a structure for improving heat radiation of a main printed circuit board disposed on the first support member, according to an embodiment of the present disclosure.
Figure 26B:
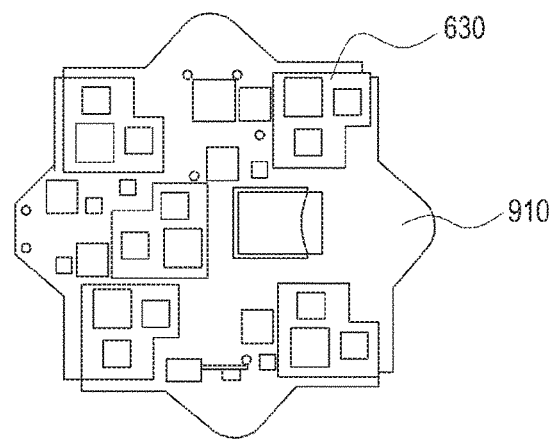
Figure 26C:
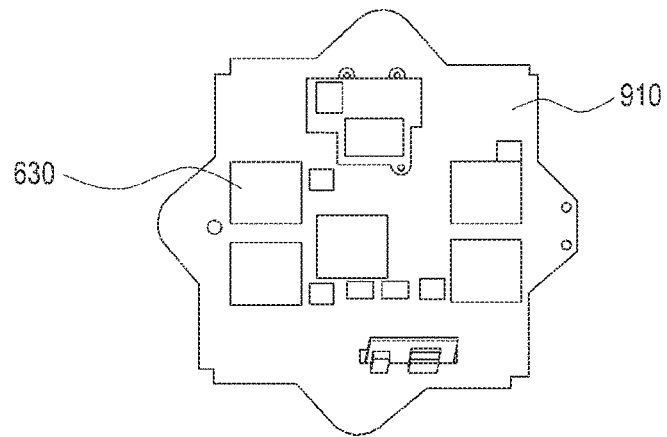

FIGS. 26A, 26B and 26C illustrate a structure for improving heat radiation of a main printed circuit board 910 disposed on the first support member 600, according to an embodiment of the present disclosure.

Referring to FIGS. 26A, 26B and 26C, a heat radiation pad 630 may be disposed to surround at least a portion of the main printed circuit board 910. In addition, the heat radiation pad 630 may be disposed on one surface of each of the electronic components mounted on the main printed circuit board 910. The heat radiation pads 630 may be individually disposed on field-programmable gate arrays (FPGAs), power management integrated circuits (PMICs), and/or Ethernet converters (LANs), respectively, among the integrated circuits disposed on the main printed circuit board 910. However, the arrangement and number of the heat radiation pads are not limited thereto. The heat radiation pads may be arranged to surround various heat sources of the sub-printed circuit portion, and may be arranged in various forms and numbers in other regions in the main printed circuit portion.

Due to the heat radiation fin structure 610, the heat radiation structure 620 and/or the heat radiation pad 630, which are disposed above and below the first support member 600, the heat generated in the printed circuit unit 900 may be rapidly cooled and transferred to the outside.

Figure 27:
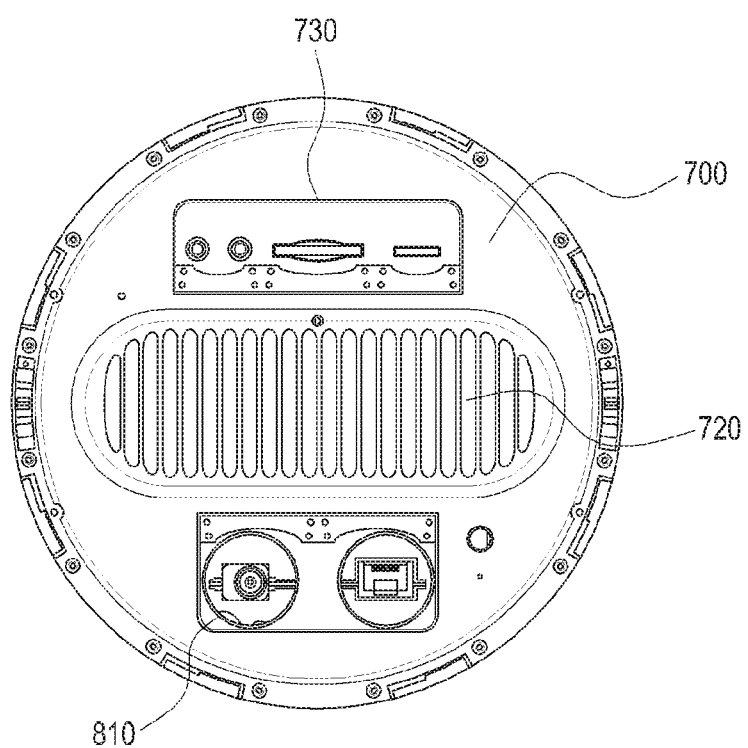
FIG. 27 is a plan view illustrating a bottom structure of a second support member, according to an embodiment of the present disclosure.

FIG. 27 is a plan view illustrating a bottom structure of a second support member 700, according to an embodiment of the present disclosure.

Figure 28:
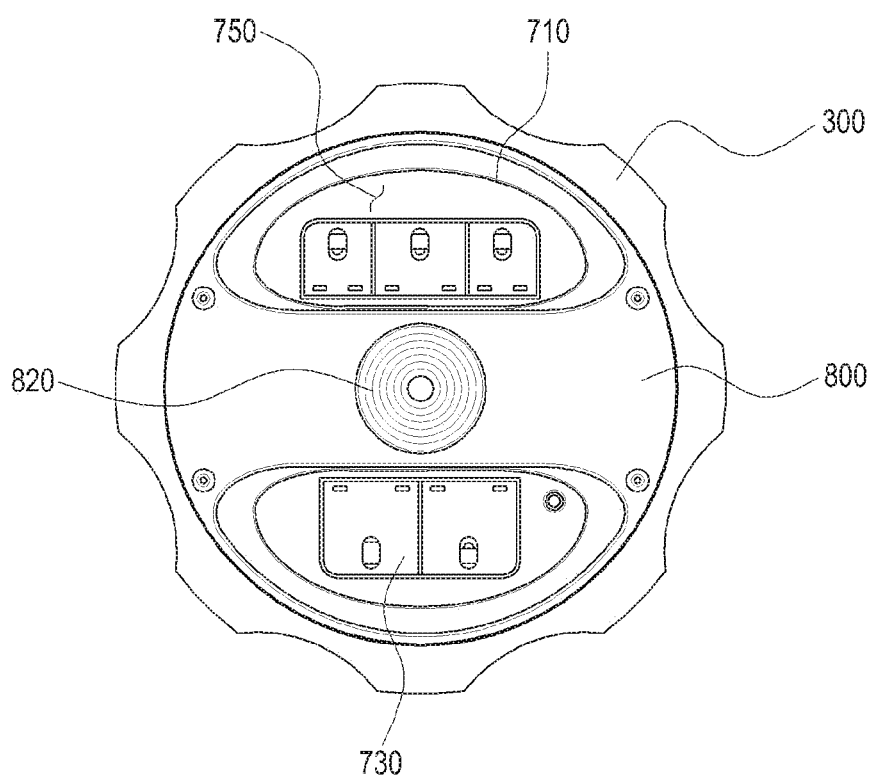
FIG. 28 is a plan view illustrating a bottom structure in which the second support member and a lower cover unit are coupled to each other, according to an embodiment of the present disclosure.

FIG. 28 is a plan view illustrating a bottom structure in which the second support member 700 and a lower cover unit 800 are coupled to each other, according to an embodiment of the present disclosure.

Referring to FIGS. 27 and 28, the second support member 700 and the lower cover unit 800 may be stacked one on another on the lower portion of the main printed circuit board 910 illustrated in FIGS. 26A to 26C, and a predetermined space 750 may be formed between the second support member 700 and the lower cover unit 800, in addition to an edge portion where the second support member 700 and the lower cover member 800 come into contact with each other.

According to an embodiment of the present disclosure, the front surface of the second support member 700 may face the main printed circuit board 910, and includes at least one heat radiation fin structure 720 on the rear surface thereof. The heat radiation fin structure 720 may be disposed in the center of the second support member 700, and this region may be the lower portion of the region where the AP chips, which are the main heat generation sources of the main printed circuit board 910, are disposed. The heat generated in the main printed circuit board 910 is transferred to the heat radiation fin structure 720 under the second support member 700, so that the heat may be efficiently emitted in the third direction (−X).

According to an embodiment of the present disclosure, the heat radiation fin structure 720 may be configured with a plurality of rip-shaped fins in order to increase the surface area from which heat is radiated. In addition to the heat radiation fin structure 720, the second support member 700 may form a predetermined space 750 with the lower cover unit 800 so as to reduce an increase in temperature due to heat generation.

According to an embodiment of the present disclosure, at least one third opening 710 may be provided outside the heat radiation fin structure 720 of the second support member 700. Third openings 710 may be disposed at both sides of the heat radiation fin structure 720, and connectors 730 may be disposed through the third openings 710 so as to provide electrical connections to the main printed circuit board 910 and/or the sub-printed circuit board 920. The connector 730 may be a microphone, an SD card, a USB, a DC, or a LAN port. The connector 730 may have a waterproof structure that seals the periphery thereof to prevent the penetration of an external fluid.

According to an embodiment of the present disclosure, the lower cover unit 800 may be coupled to the second support member 700, and may form the outer surface of the electronic device 10 together with the upper cover unit 200 and the housing 300. The lower cover unit 800 may have a circular shape, which is convex outwards (in the third direction (−X)) so as to form a space between the lower cover unit 800 and the second support member 700. As another example, the lower cover unit 800 includes one or more fourth openings 810 at positions that correspond to the third openings 710 in the second support member 700. The fourth openings 810 may provide passages through which an external electronic device or a connection member is connected to the connectors 730.

According to an embodiment of the present disclosure, a fastening portion 820, which is connectable to an external device that is capable of supporting the electronic device 10, may be provided in the center of the outer surface of the lower cover unit 800. The external device may include a tripod such that the electronic device 10 may be vertically installed so as not to be shaken. The tripod may be a generally known device.

Figure 29:
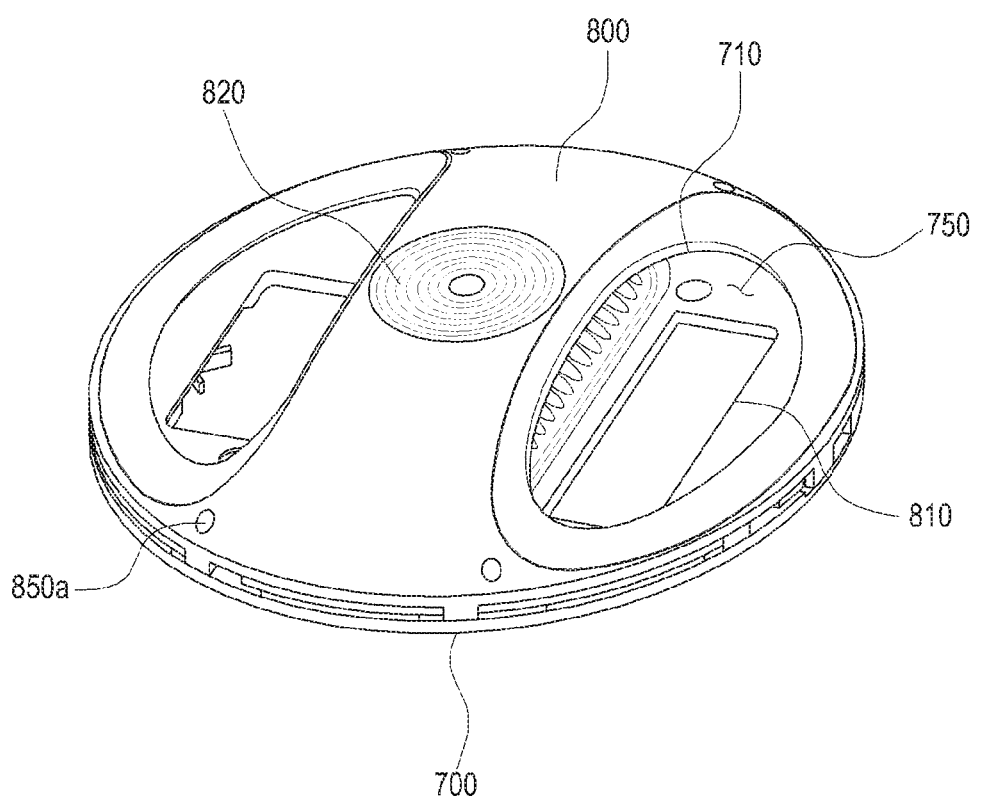
FIG. 29 is a perspective view illustrating a structure in which the second support member and the lower cover unit are coupled to each other, according to an embodiment of the present disclosure.

FIG. 29 is a perspective view illustrating a structure in which the second support member 700 and the lower cover unit 800 are coupled to each other, according to an embodiment of the present disclosure.

Figure 30:
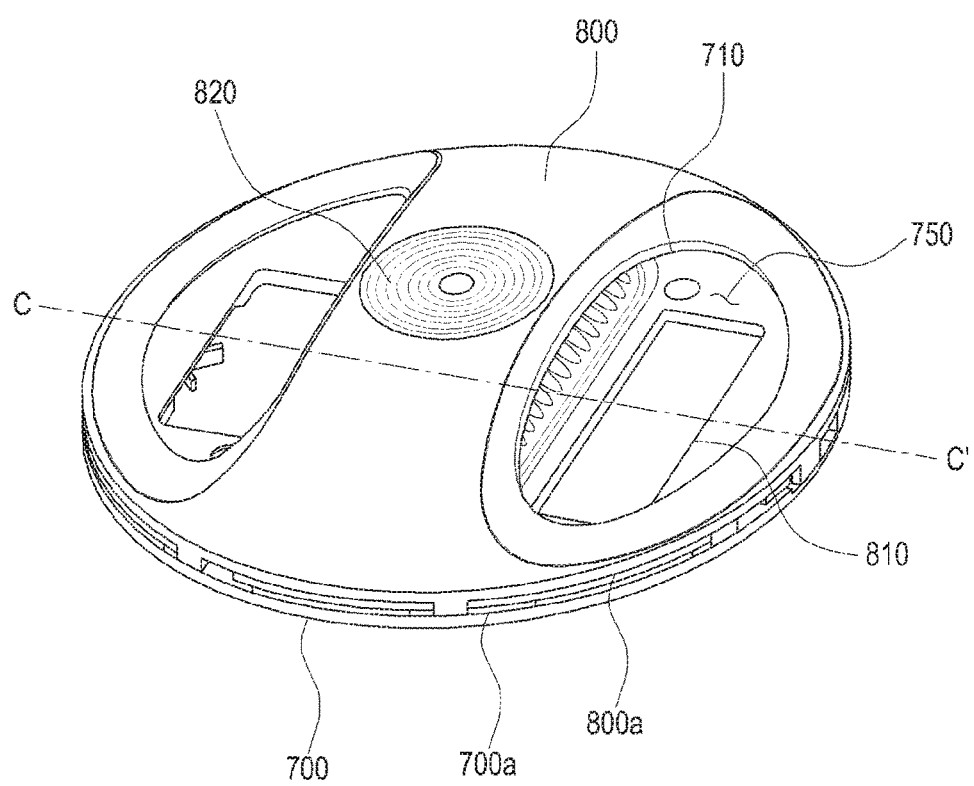
FIG. 30 is a perspective view illustrating a structure in which the second support member and the lower cover unit are coupled to each other, according to an embodiment of the present disclosure.

FIG. 30 is a perspective view illustrating a structure in which the second support member 700 and the lower cover unit 800 are coupled to each other, according to an embodiment of the present disclosure.

Figure 31:
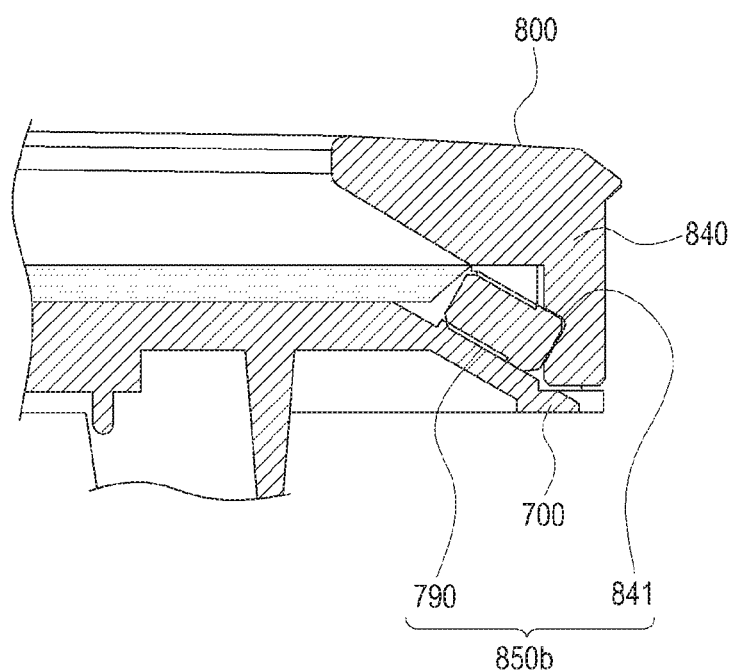
FIG. 31 is a cross-sectional view taken along line C-C' in FIG. 30, according to an embodiment of the present disclosure.

FIG. 31 is a cross-sectional view taken along line C-C' in FIG. 30, according to an embodiment of the present disclosure.

Referring to FIG. 29, the second support member 700 and the lower cover part 800 may be coupled to each other when fastening members are fastened on the bottom surface of the lower cover unit 800. For example, fastening bosses or first fastening holes 850a penetrating the lower cover unit 800 may be formed in the edge region of the lower cover unit 800. In addition, the second support member 700 may be formed with fastening bosses or second fastening holes 850a at positions corresponding to the fastening bosses or the first fastening holes 850a in the lower cover unit 800, and the second support member 700 and the lower cover unit 800 may be bound to each other and facing each other when the fastening members, such as screws, are fastened to the fastening bosses or the second fastening holes 850a.

Referring to FIGS. 30 and 31, the second support member 700 and the lower cover unit 800 are coupled to each other when fastening members are fastened to a predetermined space between the second support member 700 and the lower cover unit 800.

According to an embodiment of the present disclosure, the lower cover unit 800 includes at least one coupling portion 840 protruding in the first direction (+X), and a coupling recess 841 having an inclination, which corresponds to the coupling direction of the fastening member, may be formed inside the coupling portion 840. The coupling recess 841 may be coupled with the coupling hole 790 of the second support member 700 so as to form one fastening hole 850b, into which the fastening member may be inserted.

According to an embodiment of the present disclosure, the second support member 700 includes at least one fastening hole 850b along the coupling direction of the fastening member. The fastening hole 850b may be disposed in a visible space such that the user may insert the fastening member through the third opening 810 in the lower cover unit 800.

According to an embodiment of the present disclosure, when a fastening member, such as a screw, is fastened to one fastening hole 850b, which is formed when the recess 841 in the coupling portion 840 of the lower cover unit 800 and the hole 790 in the second support member 700 are joined with each other, the second support member 700 and the lower cover portion 800 may be bound to each other in the state in which the second support member 700 and the lower cover portion 800 face each other.

According to an embodiment of the present disclosure, the recess 841 in the coupling portion 840 of the lower cover unit 800 may be disposed in a plural number along a ring-shaped line of the edge portion of the lower cover unit 800, and corresponding thereto, the hole 790 in the second support member 700 may also be disposed in a plural number along the ring-shaped line of the edge portion of the second support member 700.

By the above-described fastening structure, the fastening members, such as screws, are not visible from the outside, and as a result, a simple and clean external design of the electronic device 10 is provided.

Figure 32:
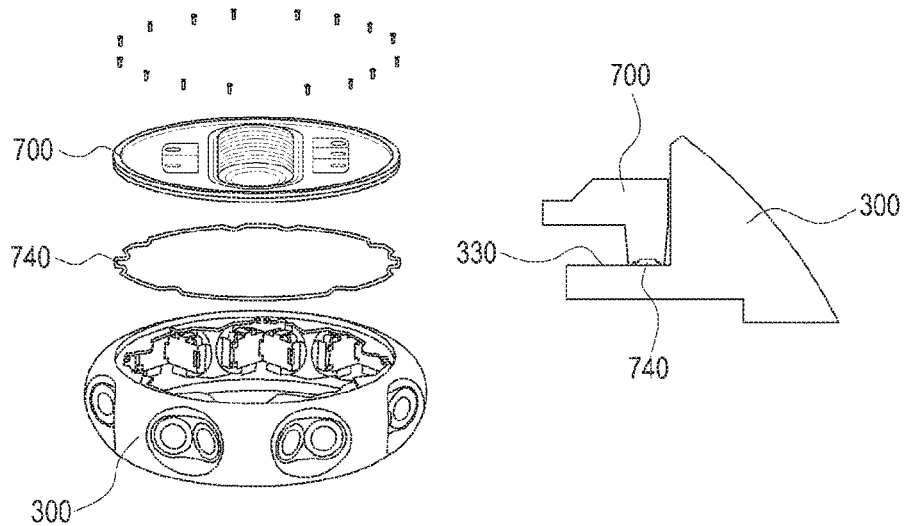
FIG. 32 illustrates an exploded perspective view and a cross-sectional view of a coupling and waterproof structure of the second support member and the housing, according to an embodiment of the present disclosure.

FIG. 32 illustrates an exploded perspective view and a cross-sectional view of a coupling and waterproof structure of the second support member 700 and the housing 300, according to an embodiment of the present disclosure.

Referring to FIG. 32, the second support member 700 may be coupled by being seated on the step 330 disposed at the upper side of the housing 300. A fifth sealing member 740 may be disposed between the step 330 of the first housing 300 and the second support member 700. A ring-shaped step recess may be disposed on the edge of the upper surface of the housing 300, and the fifth sealing member 740 may be seated in the step recess. The fifth sealing member 740 may be a waterproof tape having a closed curve shape. When the fifth sealing member 740 is seated, a protrusion disposed on the edge of the second support member 700 may be coupled while compressing the fifth sealing member 740, thereby blocking the entry of fluid and foreign matter from the outside. The thickness of the fifth sealing member 740 may be in the range of 0.3 mm to 1.0 mm.

According to an embodiment of the present disclosure, after the fifth sealing member 740 is disposed between the second support member 700 and the housing 300, the second support member 700 and the housing 300 may be coupled to each other. For example, a fastening hole may be disposed to penetrate the step recess 330 of the housing 300 and one surface of the second cover portion 700, and when a fastening member, such as a screw, is fastened into the fastening holes, the housing 300 and the second cover portion 250 may be bound to each other in the state in which one surface of the housing 300 and the surface of the second cover portion 250 face each other.

Figure 33:
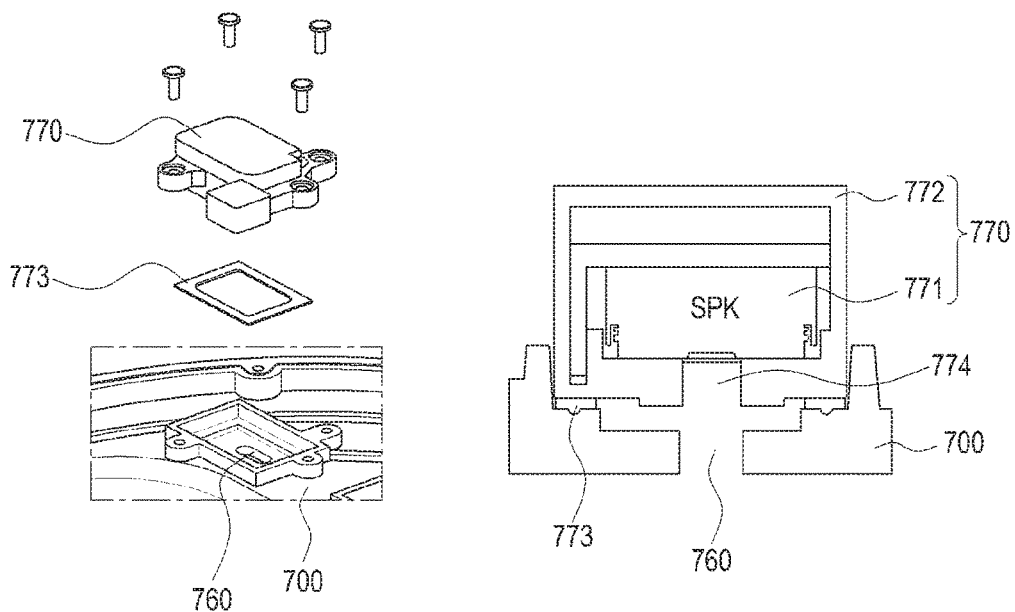
FIG. 33 illustrates an exploded perspective view and a cross-sectional view of a coupling and waterproof structure with a microphone module on the second support member, according to an embodiment of the present disclosure.

FIG. 33 illustrates an exploded perspective view and a cross-sectional view of a coupling and waterproof structure with a microphone module 770 on the second support member 700, according to an embodiment of the present disclosure.

Referring to FIG. 33, the second support member 700 includes a fifth hole 760, and includes a microphone module 770 at a position corresponding to the fifth hole 760, so that the voice of the user and the like may be recognized from the fifth hole 760.

According to an embodiment of the present disclosure, the microphone module 770 includes a microphone 771 and a microphone plate 772. The microphone plate 772 may be disposed to enclose the microphone 771 so as to protect the microphone 771, and one hole 774 may be formed along the same line as the fifth hole 760.

According to an embodiment of the present disclosure, the second support member 700 and the microphone module 770 are formed with corresponding holes 760 and 774 so as to allow the user's voice, which is transmitted to the microphone module 770, to be recognized. A waterproof member 773 may be disposed around the hole so as to block the entry of fluid and foreign matter from the outside through the hole.

According to an embodiment of the present disclosure, the waterproof member 773 may be formed in a shape corresponding to the edge portion of the microphone module 770 that is seated on the second support member 700. The waterproof member 773 may be a waterproof tape having a closed curve shape and including an elastic material. When the waterproof member 773 is seated in the seating recess disposed on the second support member 700, the edge portion of the microphone plate 772 may be coupled while compressing the waterproof member 773, thereby blocking the entry of fluid and foreign matter from the outside. The thickness of the waterproof member 773 may be in the range of 0.1 mm to 0.5 mm.

According to an embodiment of the present disclosure, after the waterproof member 773 is disposed in the peripheral portion of the fifth hole 760, the second support member 700 and the microphone module 770 may be coupled to each other. Fastening holes may be provided to penetrate one surface of the second support member 700 and one surface of the microphone module 770, and when fastening members, such as screws, are fastened into the fastening holes, the second support member 700 and the microphone module 770 may be bound to each other in a state in which one surface of the second support member 700 and one surface of the microphone module 770 face each other.

Figure 34A:
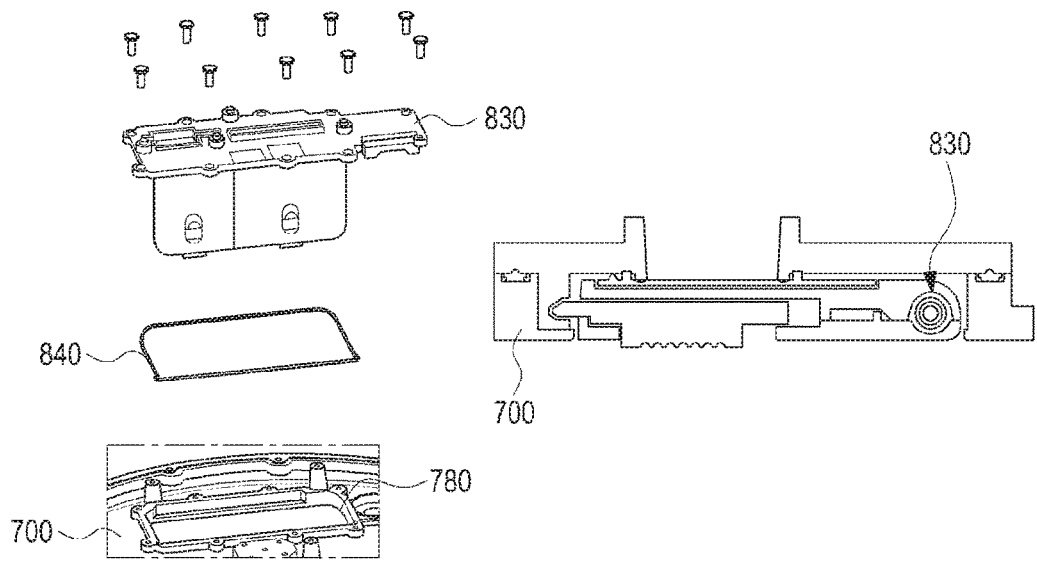
FIGS. 34A and 34B illustrate an exploded perspective view and a cross-sectional view of a coupling and waterproof structure of a hinge structure on the second support member, according to an embodiment of the present disclosure.
Figure 34B:
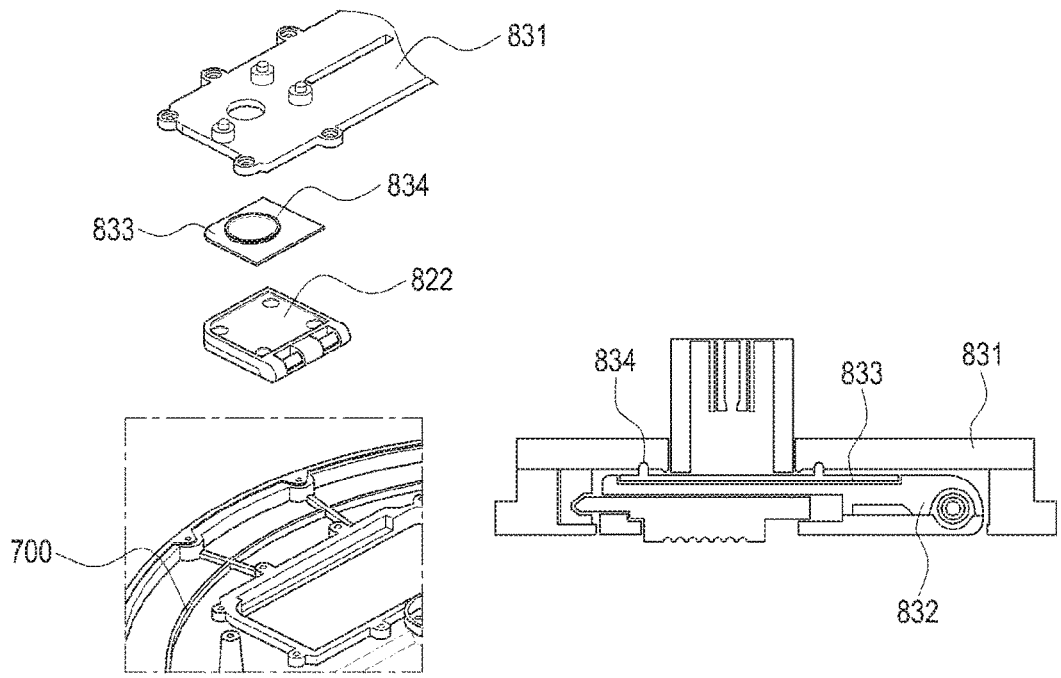

FIGS. 34A and 34B illustrate an exploded perspective view and a cross-sectional view of a coupling and waterproof structure of the second support member 700 and a hinge structure 830, according to an embodiment of the present disclosure.

Referring to FIG. 34A, the connector 730 may be connected to an external device through a plurality of holes in the second support member 700. A rotatable hinge structure 830 may be coupled to the plurality of holes in the second support member 700 in order to protect the connector 730 from foreign matter. A sixth sealing member 840 may be disposed between the second support member 700 and the hinge structure 830.

According to an embodiment of the present disclosure, a step having a closed curve shape is disposed in the peripheral portion of the plurality of hole edge portions of the second support member 700, and the sixth sealing member 840 may be seated in the step. The sixth sealing member 840 may be a waterproof tape having a closed curve shape. When the sixth sealing member 840 is seated, the hinge structure 830 may be coupled while compressing the sixth sealing member 840 disposed in the edge portion of the second support member 700, thereby blocking the entry of fluid and foreign matter from the outside. The thickness of the sixth sealing member 840 may be in the range of 0.1 mm to 0.5 mm.

According to an embodiment of the present disclosure, after the sixth sealing member 840 is disposed between the second support member 700 and the hinge structure 830, the second support member 700 and the hinge structure 830 may be coupled to each other. Fastening holes may be disposed to penetrate the step 780 of the second support member 700 and one surface of the hinge structure 830, and when fastening members, such as screws, are fastened into the fastening holes, the second support member 700 and the hinge structure 830 may be bound to each other in the state in which one surface of the second support member 700 and one surface of the hinge structure 830 face each other.

Referring to FIG. 34B, the hinge structure 830 includes a connector holder 831 and a plate 822, which is rotatably coupled to the connector holder 831 so as to open or close the hole disposed in the connector holder 831. For example, in the state where the connector 730 is not connected, the plate 822 is disposed to face the connector holder 831 to close the hole, and in the state where the connector 730 is connected to an external device, the plate 822 may be rotated with respect to the connector holder 831 so as to keep the hole in the open state.

According to an embodiment of the present disclosure, a waterproof member 833 may be disposed between the connector holder 831 and the plate 822. The waterproof member 833 may be implemented in a shape corresponding to the plate 822. The waterproof member 833 includes a protrusion 834 that protrudes toward the connector holder 831.

According to an embodiment of the present disclosure, a waterproof member 833 having the plate shape may be seated on one surface of the plate 822. The protrusion 834 of the waterproof member 833 may seal the periphery of the hole, and may include an elastic material. When the waterproof member 833 is seated, the plate 822 of the hinge structure 830 may compress the protrusion 834 of the waterproof member 833, which forms a contact point with the connector holder 831, thereby blocking the entry of fluid and foreign matter from the outside.

An electronic device, according to an embodiment of the present disclosure, includes an upper cover unit including at least one first camera that faces a first direction, a plurality of second camera pairs disposed to face a second direction that is different from the first direction, and second cameras included in each of the second camera pairs being arranged to face directions that intersect each other, a housing including a plurality of first openings, to which the plurality of second camera pairs are coupled to be exposed to an outside, and a first support member disposed in an accommodation space inside the housing, and providing a seating space for a printed circuit unit electrically connected with a connector of the upper cover unit.

According to an embodiment, the electronic device may further include a bracket coupled to the first opening in the housing to be at least partially exposed to the outside, and including at least one pair of second openings in each of which a pair of second cameras are seated and a first sealing member disposed between the housing and the bracket.

According to an embodiment of the present disclosure, the electronic device may further include a second sealing member disposed between the bracket and each of the second cameras. The second sealing member may come into contact with a peripheral portion of each of the second openings to form a waterproof contact surface, thereby blocking the entry of fluid from the outside.

According to an embodiment of the present disclosure, the bracket includes a pair of second seating recesses disposed to face different directions such that the pair of second cameras are seated in the pair of second seating recesses so as to face different directions.

According to an embodiment of the present disclosure, the bracket includes a front portion including a first surface disposed to come in contact with the housing and a rear portion including a second surface disposed to come in contact with at least a portion of each of the second cameras, and the pair of second openings in the bracket may be formed to penetrate the front portion and the rear portion.

According to an embodiment of the present disclosure, a plurality of the brackets seated on the housing may be provided, the second cameras seated in different brackets may have a first imaginary axis and a third imaginary axis, respectively, with respect to a lens center, and the first imaginary axis and the third imaginary axis may face parallel directions.

According to an embodiment of the present disclosure, coupling between the bracket and the second cameras may be achieved through a fastening member that fastens the second cameras toward the second direction after the second cameras are seated in the second seating recesses, and coupling between the housing and the bracket in which the second cameras are seated may be achieved through a fastening member that fastens the bracket in the first direction or the third direction after the bracket is seated in the first seating recess in the second direction.

According to an embodiment of the present disclosure, the electronic device may further include at least one phone holder disposed between the plurality of first openings in the housing. The phone holder may be disposed at a position corresponding to at least one hole disposed in the housing to be connected to the outside so as to allow a user's voice to be transferred, and includes at least one waterproof member that blocks the entry of fluid from outside through the hole.

According to an embodiment of the present disclosure, the electronic device may further include a heat radiation plate disposed to enclose the rear portion of each of the second cameras. The heat radiation plate may be connected to the bracket so as to provide a path that allows heat generated in the second cameras to move to the bracket via the heat radiation plate.

An electronic device according to an embodiment of the present disclosure includes an upper cover unit including at least one first camera that faces a first direction a housing including a plurality of brackets in each of which a pair of second cameras that face second directions different from the first direction are disposed, and a plurality of first openings such that the plurality of brackets are at least partially exposed to an outside, a first support member disposed in an accommodation space inside the housing so as to provide a seating space for a printed circuit unit, a lower cover unit disposed in a lower portion of the housing, and including at least one third opening exposed to the outside for connection to an external electronic device, and a second support member disposed between the lower cover unit and the first support member and including at least one fourth opening disposed at a position corresponding to the third opening in the lower cover unit.

According to an embodiment of the present disclosure, at least one first fastening hole may be disposed at a side of an edge of the lower cover unit and at least one second fastening hole may be provided in a side of a lower portion of the second support member at a position corresponding to the first fastening hole in the lower cover unit, and the electronic device may further include a fastening member that passes through the first fastening hole and the second fastening hole so as to couple the lower cover unit and the second support member to each other.

According to an embodiment of the present disclosure, the lower cover unit includes therein at least one coupling recess at a position facing the second support member, the second support member includes a coupling hole disposed to be coupled with the coupling recess so as to form one fastening hole, and the electronic device may further include a fastening member that is inserted into an inside between the lower cover unit and the second support member through the third opening, the fastening member being coupled to the fastening hole in a manner such that the fastening member is not exposed to an outer surface of the lower cover unit.

According to an embodiment of the present disclosure, the electronic device may further include a heat radiation fin structure integrally molded below the second support member and disposed to radiate heat generated from the printed circuit unit through a space between the second support member and the lower cover unit.

According to an embodiment of the present disclosure, the electronic device may further include a hinge structure disposed below the second support member to open/close a connector disposed on the printed circuit unit with respect to the outside. The hinge structure includes a waterproof member that provides a protrusion that forms a waterproof contact point by coming into contact with a peripheral surface of at least one hole in the second support member, which is disposed along the same line as the connector.

According to an embodiment of the present disclosure, the upper cover unit includes a first cover portion in which at least one hole is disposed so as to expose a data input/output unit and the first camera, and a second cover portion disposed below the first cover portion, the data input/output unit and the first camera being seated in the second cover unit to face the first direction, and the electronic device may further include a third sealing member disposed between the first cover portion and the second cover portion, and a fourth sealing member disposed between the second cover unit and the housing.

According to an embodiment of the present disclosure, the printed circuit unit includes a main printed circuit board disposed between the first support member and the second support member, and a sub-printed circuit board disposed on the first support member to be perpendicular to the main printed circuit board.

According to an embodiment of the present disclosure, the electronic device may further include at least one heat radiation fin structure disposed above the first support member adjacent to at least one hole in the first support member, and a heat radiation plate structure disposed below the first support member and having at least one heat pipe mounted along a heat source path on the main printed circuit board.

According to an embodiment of the present disclosure, the heat radiation fin structure includes a plurality of fins that protrude in the first direction, and may radiate heat transferred to the printed circuit unit to the outside via the accommodation space.

An electronic device according to an embodiment of the present disclosure includes a bracket that includes a front portion including a first surface that is in contact with a first opening in a housing, a rear portion including a second surface disposed to be in contact with at least a portion of a pair of cameras, and a pair of second openings formed to penetrate the front portion and the rear portion. The second openings may be disposed to form a predetermined angle such that the pair of cameras may face different directions, and lenses of the pair of camera may be exposed to an outside through the second openings.

According to an embodiment, the front portion of the bracket has an outer diameter that is smaller than an outer diameter of the rear portion.

While the present disclosure has been shown and described with reference to certain embodiments thereof, it will be apparent to those skilled in the art that the present disclosure is not limited to these embodiments, and various changes in form and details may be made therein without departing from the spirit and scope of the present disclosure as defined by the appended claims and their equivalents.

What is claimed is:

1. An electronic device comprising:
   an upper cover unit including at least one first camera that faces a first direction;
   a plurality of second camera pairs disposed to face a second direction, and second cameras included in each of the second camera pairs being arranged to face directions that intersect each other;
   a housing including a plurality of first openings, to which the plurality of second camera pairs are coupled to be exposed to an outside;
   a first support member disposed in an accommodation space inside the housing, and providing a seating space for a printed circuit unit electrically connected with a connector of the upper cover unit; and
   a bracket coupled to a first opening in the housing to be at least partially exposed to the outside, and including at least one pair of second openings in each of which a pair of second cameras are seated; and
   a first sealing member disposed between the housing and the bracket.

2. The electronic device of claim 1, further comprising:
   a second sealing member disposed between the bracket and each of the second cameras,
   wherein the second sealing member is in contact with a peripheral portion of each of the second openings to form a waterproof contact surface, thereby blocking entry of a fluid from the outside.

3. The electronic device of claim 1, wherein the bracket includes a pair of second seating recesses disposed to face different directions such that the pair of second cameras are seated in the pair of second seating recesses so as to face different directions.

4. The electronic device of claim 3, wherein the bracket includes a front portion including a first surface disposed to contact the housing and a rear portion including a second surface disposed to contact at least a portion of each of the second cameras, and
   the pair of second openings in the bracket are formed to penetrate the front portion and the rear portion.

5. The electronic device of claim 2, wherein a plurality of the brackets are seated on the housing, the second cameras seated in different brackets have a first imaginary axis and a third imaginary axis, respectively, with respect to a lens center, and the first imaginary axis and the third imaginary axis face parallel directions.

6. The electronic device of claim 3, wherein coupling between the bracket and the second cameras is achieved through a fastening member that fastens the second cameras toward the second direction after the second cameras are seated in the second seating recesses, and
   coupling between the housing and the bracket in which the second cameras are seated is achieved through a fastening member that fastens the bracket in the first direction or the third direction after the bracket is seated in the first seating recess in the second direction.

7. The electronic device of claim 1, further comprising:
   at least one phone holder disposed between the plurality of first openings in the housing,
   wherein the phone holder is disposed at a position corresponding to at least one hole disposed in the housing to be connected to the outside so as to allow a user's voice to be transferred, and includes at least one waterproof member that blocks entry of fluid from an outside through the hole.

8. The electronic device of claim 1, further comprising:
   a heat radiation plate disposed to enclose a rear portion of each of the second cameras,
   wherein the heat radiation plate is connected to the bracket so as to provide a heat transfer path that allows heat generated in the second cameras to transfer to the bracket via the heat radiation plate.

9. An electronic device comprising:
   an upper cover unit including at least one first camera that faces a first direction;
   a housing including a plurality of brackets in each of which a pair of second cameras that face second directions are disposed, and a plurality of first openings such that the plurality of brackets are at least partially exposed to an outside;
   a first support member disposed in an accommodation space inside the housing so as to provide a seating space for a printed circuit unit;
   a lower cover unit disposed in a lower portion of the housing, and including at least one third opening exposed to the outside for connection to an external electronic device; and
   a second support member disposed between the lower cover unit and the first support member, and including at least one fourth opening disposed at a position corresponding to the third opening in the lower cover unit.

10. The electronic device of claim 9, wherein at least one first fastening hole is disposed at a side of an edge of the lower cover unit and at least one second fastening hole is provided on a side of a lower portion of the second support member at a position corresponding to the first fastening hole in the lower cover unit, and
    the electronic device further comprises a fastening member that passes through the first fastening hole and the second fastening hole so as to couple the lower cover unit and the second support member to each other.

11. The electronic device of claim 9, wherein the lower cover unit includes at least one coupling recess at a position facing the second support member,
    the second support member includes a coupling hole disposed to be coupled with the coupling recess so as to form one fastening hole, and
    the electronic device further comprises a fastening member that is inserted into the lower cover unit and the second support member through the third opening, the fastening member being coupled to the fastening hole in a manner such that the fastening member is not exposed to an outer surface of the lower cover unit.

12. The electronic device of claim 9, further comprising:
    a heat radiation fin structure below the second support member and disposed to radiate heat generated from the printed circuit unit through a space between the second support member and the lower cover unit.

13. The electronic device of claim 9, further comprising:
    a hinge structure disposed below the second support member to open/close a connector disposed on the printed circuit unit with respect to the outside,
    wherein the hinge structure includes a waterproof member that provides a protrusion that forms a waterproof contact point by coming into contact with a peripheral surface of at least one hole in the second support member, which is disposed on a same line as the connector.

14. The electronic device of claim 9, wherein the upper cover unit includes a first cover portion in which at least one hole is disposed so as to expose a data input/output unit and the first camera, and a second cover portion disposed below the first cover portion, the data input/output unit and the first camera being seated in the second cover unit to face the first direction, and the electronic device further comprises a third sealing member disposed between the first cover portion and the second cover portion, and a fourth sealing member disposed between the second cover unit and the housing.

15. The electronic device of claim 9, wherein the printed circuit unit includes a main printed circuit board disposed between the first support member and the second support member, and a sub-printed circuit board disposed on the first support member to be perpendicular to the main printed circuit board.

16. The electronic device of claim 15, further comprising:

at least one heat radiation fin structure disposed above the first support member adjacent to at least one hole of the first support member; and a heat radiation plate structure disposed below the first support member and having at least one heat pipe mounted along a heat source path on the main printed circuit board.

17. The electronic device of claim 16, wherein the heat radiation fin structure includes a plurality of fins that protrude in the first direction, and radiates heat transferred to the printed circuit unit to the outside via the accommodation space.

18. An electronic device comprising a bracket, wherein the bracket includes:

a front portion including a first surface that is in contact with a first opening of a housing;

a rear portion including a second surface disposed to be in contact with at least a portion of a pair of cameras; and a pair of second openings formed to penetrate the front portion and the rear portion, and wherein the second openings are disposed to form a predetermined angle such that the pair of cameras face different directions, and lenses of the pair of camera are exposed to an outside through the second openings.

19. The electronic device of claim 18, wherein the front portion of the bracket has an outer diameter that is smaller than an outer diameter of the rear portion.

* * * * *